United States Patent
Bordeanu et al.

(10) Patent No.: US 12,534,587 B2
(45) Date of Patent: Jan. 27, 2026

(54) THERMALLY EXPANDABLE COMPOSITIONS COMPRISING A CHEMICAL BLOWING AGENT

(71) Applicant: SIKA TECHNOLOGY AG, Baar (CH)

(72) Inventors: Nicolae Bordeanu, Winterthur (CH); Shunsuke Yamada, Chigasaki (JP); Dusko Paripovic, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 883 days.

(21) Appl. No.: 17/618,119

(22) PCT Filed: Jun. 12, 2020

(86) PCT No.: PCT/EP2020/066336
§ 371 (c)(1),
(2) Date: Dec. 10, 2021

(87) PCT Pub. No.: WO2020/249752
PCT Pub. Date: Dec. 17, 2020

(65) Prior Publication Data
US 2022/0227955 A1    Jul. 21, 2022

(30) Foreign Application Priority Data
Jun. 14, 2019    (EP) .................................... 19180384

(51) Int. Cl.
*C08J 9/10*    (2006.01)
*C08J 9/00*    (2006.01)

(52) U.S. Cl.
CPC ............ *C08J 9/104* (2013.01); *C08J 9/0028* (2013.01); *C08J 2203/22* (2013.01); *C08J 2207/00* (2013.01); *C08J 2300/22* (2013.01); *C08J 2300/26* (2013.01)

(58) Field of Classification Search
CPC ...... C08J 9/104; C08J 9/0028; C08J 2300/22; C08J 2300/26
See application file for complete search history.

(56) References Cited

U.S. PATENT DOCUMENTS

| | | | |
|---|---|---|---|
| 2004/0266899 A1* | 12/2004 | Muenz | C08J 9/0061 521/135 |
| 2018/0037708 A1* | 2/2018 | Lin | C08K 3/26 |
| 2018/0155277 A1* | 6/2018 | Kageyama | C08J 9/10 |

FOREIGN PATENT DOCUMENTS

| | | |
|---|---|---|
| CN | 106661423 A | 5/2017 |
| CN | 107698941 A | 2/2018 |
| DE | 10 2011 080 223 A1 | 2/2013 |
| EP | 3 196 270 A1 | 7/2017 |
| EP | 3 281 970 A1 | 2/2018 |
| JP | S61-091228 A | 5/1986 |
| JP | H11-172030 A | 6/1999 |
| JP | 2018-24872 A | 2/2018 |
| WO | 2014/182385 A1 | 11/2014 |
| WO | 2016/171036 A1 | 10/2016 |

OTHER PUBLICATIONS

Sep. 1, 2020 International Search Report issued in International Patent Application No. PCT/EP2020/066336.
Sep. 1, 2020 Written Opinion issued in International Patent Application No. PCT/EP2020/066336.

* cited by examiner

*Primary Examiner* — Christina H.W. Rosebach
(74) *Attorney, Agent, or Firm* — Oliff PLC

(57) ABSTRACT

A thermally expandable composition comprising a thermoplastic polymer compound and/or an elastomer compound, at least one blowing agent including at least one dicarboxylic acid salt of an aminoguanidine compound, optionally at least one free radical initiator and/or a vulcanization system, and at least one guanidine derivative. The invention is also related to baffle and/or a reinforcement element for hollow structures including the thermally expandable composition, to a process for manufacturing the baffle and/or reinforcement element, to use of the baffle and/or reinforcement element for sealing, baffling, or reinforcing of a cavity or a hollow structure, and to a method for sealing, baffling and/or reinforcing a cavity or hollow structure.

15 Claims, No Drawings

THERMALLY EXPANDABLE COMPOSITIONS COMPRISING A CHEMICAL BLOWING AGENT

TECHNICAL FIELD

The present invention relates to thermally expandable compositions and use thereof for providing baffle and/or reinforcement elements. Such elements are particularly suitable for use in sealing, baffling, and/or reinforcing of hollow structures, for example cavities in a hollow structural part of an automotive vehicle.

BACKGROUND OF THE INVENTION

Manufactured products often contain orifices and cavities or other hollow parts that result from the manufacturing process and/or that are designed into the product for various purposes, such as weight reduction. Automotive vehicles, for example, include several such orifices and cavities throughout the vehicle, including those in the vehicle's structural pillars and in the sheet metal of the vehicle doors. It is often desirable to seal such orifices and cavities so as to minimize noise, vibrations, fumes, dirt, water, humidity, and the like from passing from one area to another within the vehicle by means of sealing members or baffle elements built into the orifice or cavity. Likewise, such members or elements often fulfil an additional task of reinforcing the hollow structure of the manufactured product, for example an automotive part, so much that it becomes more resistant to mechanical stress but still maintains the low weight advantage of the hollow structure.

Such elements used for sealing, baffling or reinforcing often consist of a carrier, made of plastic, metal, or another rigid material, and one or more layers of a thermoplastic material attached to it which is able to expand its volume when heat or another physical or chemical form of energy is applied, but they can also be entirely made of expandable material. Using an adequate design, it is possible to insert the baffle or reinforcement element into the hollow part of the structure during the manufacturing process but also to leave the inner walls of the structure still accessible (or the cavities passable) by for example a liquid. For example, during the manufacture process of a vehicle, the hollow parts of a metal frame can still be largely covered by an electro-coating ("e-coat") liquid while the baffle or reinforcement elements are already inserted, and afterwards during a heat treatment step, the expandable thermoplastic material of the baffle or reinforcement element expands to fill the cavities as intended.

The development of such baffles or reinforcement elements has led to highly advanced systems, where the expandable material is able to increase its volume by up to several hundred percent, forming a stable, cross-linked foam-like structure that fills the cavities and adhering to the walls of the structure intended to be sealed, baffled, or reinforced. Especially in automotive manufacturing, this has led to considerable weight reduction and excellent dampening of noise or vibrations in the car body.

Currently employed thermally expandable compositions often consist of polymers such as ethylene-vinyl acetate polymers that can be cross-linked by radical initiators, most commonly peroxides. In order to obtain foams, these compositions furthermore contain blowing agents, the most widely used being azodicarbonamide (also called azodicarboxamide or azobisformamide) and 4,4'-oxydibenzenesulfonyl hydrazide (abbreviated OBSH). Under activation conditions, such as elevated temperature, curing of the cross-linkable network takes place, while simultaneously the blowing agent decomposes and releases gases. This leads to the above mentioned volume expansion and the formation of a stable foam, which in ideal cases fills the cavity as intended and adheres to its walls. Such a system is for example disclosed in DE 10 2011 080 223 A1. A published European patent application EP 3 281 970 A1 discloses a pumpable thermally foaming filler composition comprising a liquid epoxy resin, a polyvinylchloride resin and/or acrylic resin powder, and a blowing agent, such as an azo-compound, a nitroso compound or a hydrazine derivative. EP 3 281 970 A1 also discloses the use of dicyandiamide as a curing agent. Another published European patent application EP 2 994 502 A1 discloses the use of N,N'-di-ortho-tolyl guanidine as a curing accelerator in chemically foamed polyolefins.

One of the problems in connection with the established solutions described above is the fact that the most commonly used exothermic blowing agents, in particular azodicarbonamide (ADCA), are increasingly facing regulatory problems regarding health and safety issues.

It is thus desirable to obtain a thermally expandable thermoplastic composition that overcomes the above discussed problems related to State-of-the-Art compositions.

SUMMARY OF THE INVENTION

The object of the present invention is to provide a storage-stable thermally expandable composition that is able to expand uniformly and to cure to form a stable, cross-linked foam structure over a wide range of temperatures, for example, in the range of 120 and 200° C. Furthermore, the produced foam should exhibit decreased water uptake and good adhesion to metallic, even oily, surfaces and other substrates commonly used in manufactured articles, in particular automotive vehicles.

Another object of the present invention is to provide a thermally expandable composition without the use of exothermic chemical blowing agents, in particular azodicarbonamide (ADCA).

The subject of the present invention is a thermally expandable composition as defined in claim 1.

It was surprisingly found out that guanidine derivatives can be used as activators for chemical blowing agents based on dicarboxylic acid salts of aminoguanidine compounds. Furthermore, it was surprisingly found out that thermally expandable compositions containing a thermoplastic polymer component, at least one chemical blowing agent comprising at least one dicarboxylic acid salt of an aminoguanidine compound, and at least one guanidine derivate exhibit, in addition to increased volume expansion rate, also improved foam characteristics and a stable expansion over a wide temperature range.

One of the advantages of the thermally expandable composition of the present invention is that high volume expansion rates can be achieved over a wide range of temperatures without the use of exothermic blowing agents, in particular without use of azodicarbonamide.

Other subjects of the present invention are presented in other independent claims. Preferred aspects of the invention are presented in the dependent claims.

DETAILED DESCRIPTION OF THE INVENTION

The subject of the present invention is a thermally expandable composition comprising:
a) A thermoplastic polymer component P and/or an elastomer component E,
b) At least one blowing agent BA comprising at least one dicarboxylic acid salt of an aminoguanidine compound,
c) Optionally at least one free radical initiator I and/or a vulcanization system VS, and
d) At least one guanidine derivative G different from the at least one dicarboxylic acid salt of an aminoguanidine compound, wherein said aminoguanidine compound is represented by formula (I)

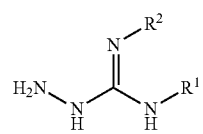

(I)

wherein $R^1$ and $R^2$ represent independently from each other a hydrogen atom or an amino group.

Substance names beginning with "poly" designate substances which formally contain, per molecule, two or more of the functional groups occurring in their names. For instance, a polyol refers to a compound having at least two hydroxyl groups. A polyether refers to a compound having at least two ether groups.

The term "polymer" refers to a collective of chemically uniform macromolecules produced by a polyreaction (polymerization, polyaddition, polycondensation) where the macromolecules differ with respect to their degree of polymerization, molecular weight and chain length. The term also comprises derivatives of said collective of macromolecules resulting from polyreactions, that is, compounds which are obtained by reactions such as, for example, additions or substitutions, of functional groups in predetermined macromolecules and which may be chemically uniform or chemically non-uniform.

The term "elastomer" refers to any natural, synthetic, or modified high molecular weight polymer or combination of polymers, which is capable of recovering from large deformations, i.e. has elastic properties. Typical elastomers are capable of being elongated or deformed to at least 200% of their original dimension under an externally applied force, and will substantially resume the original dimensions, sustaining only small permanent set (typically no more than about 20%), after the external force is released. In particular, the term "elastomer" designates elastomers that have not been chemically crosslinked. The term "chemically cross-linked" is understood to mean that the polymer chains forming the elastomer are inter-connected by a plurality of covalent bonds, which are mechanically and thermally stable.

The term "molecular weight" refers to the molar mass (g/mol) of a molecule or a part of a molecule, also referred to as "moiety". The term "average molecular weight" refers to number average molecular weight (Mn) of an oligomeric or polymeric mixture of molecules or moieties. The molecular weight may be determined by conventional methods, preferably by gel permeation-chromatography (GPC) using polystyrene as standard, styrene-divinylbenzene gel with porosity of 100 Angstrom, 1000 Angstrom and 10000 Angstrom as the column, and tetrahydrofurane as a solvent, at 35° C.

The "amount or content of at least one component X" in a composition, for example "the amount of the at least one thermoplastic polymer TP" refers to the sum of the individual amounts of all thermoplastic polymers TP contained in the composition. For example, in case the at least one thermoplastic polymer TP comprises 20 wt.-% of the total weight of the composition, the sum of the amounts of all thermoplastic polymers TP contained in the composition equals 20 wt.-%.

The term "room temperature" designates a temperature of 23° C.

The thermally expandable composition comprises at least one chemical blowing agent BA comprising at least one dicarboxylic acid salt of an aminoguanidine compound of formula (I).

According to one or more embodiments, the molar ratio of the amount of the aminoguanidine compound of formula (I) to the amount of the dicarboxylic acid in the at least one dicarboxylic acid salt of the aminoguanidine compound of formula (I) (aminoguanidine compound:dicarboxylic acid) is in the range of 1:1 to 2:1, preferably in the range of 1:1 to 1.5:1, more preferably in the range of 1:1 to 1.2:1.

Accordingly, the at least one dicarboxylic acid salt of the aminoguanidine compound of formula (I) according to these embodiments can also be represented by formula (I-I)

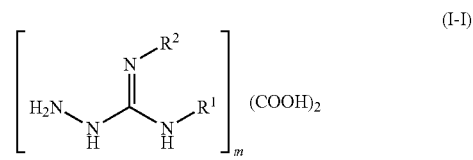

(I-I)

wherein $R^1$ and $R^2$ have the same meaning as described further above; and m is a number in the range of 1.0 to 2.0.

The amount of the at least one chemical blowing agent BA in the thermally expandable composition is not particularly restricted. The preferred amount of the at least one chemical blowing agent BA depends, in particular, of the desired volume expansion rate of the thermally expandable composition.

According to one or more embodiments, the at least one chemical blowing agent BA comprises 0.5-35 wt.-%, preferably 1-25 wt.-%, more preferably 2.5-20 wt.-%, even more preferably 2.5-15 wt.-%, still more preferably 5-15 wt.-%, in particular 5-12.5 wt.-% of the total weight of the thermally expandable composition.

According to one or more embodiments, the at least one chemical blowing agent BA comprises at least 5 wt.-%, preferably at least 25 wt.-%, more preferably at least 35 wt.-%, even more preferably at least 45 wt.-%, still more preferably at least 55 wt.-%, in particular at least 65 wt.-% of the at least one dicarboxylic acid salt of the aminoguanidine compound of formula (I).

According to one or more further embodiments, the at least one chemical blowing agent BA comprises at least 50 wt.-%, preferably at least 65 wt.-%, more preferably at least 75 wt.-%, even more preferably at least 85 wt.-%, still more preferably at least 95 wt.-%, in particular at least 98 wt.-% of the at least one dicarboxylic acid salt of the aminoguanidine compound of formula (I). It may also be preferred that the at least one blowing agent BA is essentially composed of the at least one dicarboxylic acid salt of the aminoguanidine compound of formula (I). The expression "essentially composed of" is understood to mean that at least one blowing agent comprises one or more dicarboxylic acid salts of the aminoguanidine compound of formula (I), wherein the amount of the other constituents is less than 0.5 wt.-%, more preferably less than 0.25 wt.-%, even more preferably less than 0.1 wt.-%, based on the total weight of the at least one blowing agent BA.

According to one or more embodiments, the at least one dicarboxylic acid salt of the aminoguanidine compound of formula (I) comprises 0.1-35 wt.-%, preferably 1-25 wt.-%, more preferably 2.5-20 wt.-%, even more preferably 2.5-15 wt.-%, still more preferably 5-15 wt.-%, in particular 5-12.5 wt.-% of the total weight of the thermally expandable composition.

Preferably, the at least one chemical blowing agent BA is present in the thermally expandable composition in form solid particles having a $d_{90}$ particle size of not more than 350 μm, more preferably not more than 250 μm, even more preferably not more than 200 μm, still more preferably not more than 150 μm. The term "$d_{90}$ particle size" refers to a particle size below which 90% of all particles by mass are smaller than the $d_{90}$ value. The term "particle size" refers in the present document to the area-equivalent spherical diameter of a particle. The particle size distribution can be determined by laser diffraction method as described in standard ISO 13320:2009.

According to one or more embodiments, the at least one chemical blowing agent BA has a $d_{90}$ particle size in the range of 1-250 μm, preferably 5-200 μm, more preferably 15-150 μm, even more preferably 25-150 μm, still more preferably 35-125 μm.

According to one or more embodiments, the at least one chemical blowing agent BA has a maximum decomposition peak temperature measured by Differential Scanning Calorimetry (DSC) in the range of 135-250° C., preferably 145-225° C., more preferably 155-225° C., even more preferably 160-215° C. Preferably, the maximum decomposition peak measured by DSC is determined by a DSC822e differential scanning calorimeter from Mettler-Toledo by keeping the sample for 2 min at 25° C., then heating the sample from 25° C. to 280° C. at a rate of 5° C./min, then keeping the sample for 2 min at 280° C. and finally cooling the sample from 280° C. to 25° C. at a rate of 10° C./min.

Although some of the compounds used in the present invention are characterized as useful for specific functions, it should be understood that the use of these compounds is not limited to their typical functions. For example, it is possible that the aminoguanidine compound released during the decomposition of the at least one blowing agent BA at elevated temperature is able of acting as a hardener for polymers having functional groups.

According to one or more preferred embodiments, the at least one dicarboxylic acid salt of the aminoguanidine compound of formula (I) is an oxalic acid salt of the aminoguanidine compound of formula (I).

According to one or more embodiments, the aminoguanidine compound of formula (I) is selected from the group consisting of aminoguanidine, diaminoguanidine, and triaminoguanidine, According to one or more preferred embodiments, the aminoguanidine compound of formula (I) is aminoguanidine.

Oxalic acid salts of the aminoguanidine compound of formula (I) can be obtained by reacting an aminoguanidine compound, such as carbonic acid salt of an aminoguanidine compound, with oxalic acid. Oxalic acid salts of aminoguanidine compounds of formula (I) and detailed description of methods for production thereof are disclosed, for example, in a published European patent application EP 3196270 A1.

According to one or more embodiments, the at least one chemical blowing agent BA is a microencapsulated blowing agent. The term "microencapsulated blowing agent" refers in the present disclosure to a blowing agent having a core-shell structure.

Suitable microencapsulated blowing agents BA have a core component consisting of the at least one dicarboxylic acid salt of the aminoguanidine compound of formula (I) or of a composition containing the at least one oxalic acid salt of the aminoguanidine compound of formula (I).

The composition of the shell component of the microencapsulated blowing agent is not particularly limited. Suitable compounds to be used in the shell component include, for example, polymethyl methacrylate and copolymers of methyl methacrylate with another co-monomer. The shell component of the microencapsulated blowing agent may further comprise one or more fatty acid salts or a surfactant as a dispersant. Suitable co-monomers to be used in combination with the methyl methacrylate monomer include, for example, acrylic acid esters, such as methyl acrylate, ethyl acrylate, butyl acrylate, and dicyclopentenyl acrylate, methacrylic acid esters such as ethyl methacrylate, butyl methacrylate, and isobornyl methacrylate, acrylonitrile, methacrylonitrile, vinylidene chloride, vinyl chloride, styrene, vinyl acetate, α-methylstyrene, chloroprene, neoprene, and butadiene.

The thermally expandable composition further comprises at least one guanidine derivative G different from the at least one dicarboxylic acid salt of the aminoguanidine compound of formula (I).

According to one or more embodiments, the at least one guanidine derivative G is a functional guanidine of formula (II):

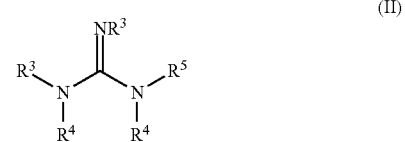

wherein $R^3$ represents a hydrogen atom or a monovalent linear or branched alkyl radical having 1 to 10 carbon atoms which furthermore optionally comprises a nitrogen atom, a cycloaliphatic radical, or an aryl or aryl alkyl radical;
  $R^4$ represents a hydrogen atom or a monovalent linear or branched alkyl radical having 1 to 10 carbon atoms; and
  $R^5$ represents a hydrogen atom or a monovalent linear or branched alkyl radical having 1 to 10 carbon atoms, or a cycloaliphatic radical which furthermore optionally comprises a nitrogen atom and/or an oxygen atom and/or silicon atom, an aryl radical, or an aryl alkyl radical.

According to one or more embodiments, the at least one guanidine derivative G is selected from the group consisting of cyanoguanidine, methyl guanidine, dimethyl guanidine, trimethyl guanidine, tetramethyl guanidine, acetylacetoneguanidine, 1,3-Di-o-tolylguanidine, 2-tert-Butyl-1,1,3,3-tetramethylguanidine, 1,2-dicyclohexyl-3-hexylguanidine, 1,2-Diisopropyl-3-phenylguanidine, and 1,2-Bis(2,6-diisopropylphenyl)-3-hexylguanidine.

According to one or more embodiments, the at least one guanidine derivative G is cyanoguanidine.

Suitable guanidine derivatives are commercially available, for example, under the trade name of Dyhard® (from AlzChem Group AG).

According to one or more embodiments, the at least one guanidine derivative G comprises 0.1-10.0 wt.-%, preferably 0.25-7.5 wt.-%, more preferably 0.35-5.0 wt.-%, more preferably 0.5-5.0 wt.-%, even more preferably 0.5-4.5 wt.-% of the total weight of the thermally expandable composition.

According to one or more embodiments, component a) of the thermally expandable composition comprises or is composed of the thermoplastic polymer component P.

According to one or more embodiments, the thermoplastic polymer component P comprises at least 35 wt.-%, preferably at least 45 wt.-%, more preferably at least 55 wt.-%, even more preferably at least 60 wt.-%, of the total weight of the thermally expandable composition.

According to one or more embodiments, the thermoplastic polymer component P comprises 35-90 wt.-%, preferably 45-90 wt.-%, more preferably 45-85 wt.-%, even more preferably 50-85 wt.-%, still more preferably 55-85 wt.-% of the total weight of the thermally expandable composition.

Principally all thermoplastic polymers and thermoplastic elastomers (TPE) are suitable for use as the thermoplastic polymer component P. According to one or more embodiments, the thermoplastic polymer component P comprises at least one epoxy-functional polymer EP and/or at least one acid anhydride-functional polymer AP and/or at least one thermoplastic polymer TP.

According to one or more embodiments, component a) of the thermally expandable composition comprises or is composed of the thermoplastic polymer component P, wherein the thermally expandable composition further comprises at least one free radical initiator I. In these embodiments, in particular wherein component a) of the thermally expandable composition is composed of the thermoplastic polymer component P, it may furthermore be preferred that component c) of the thermally expandable composition is composed of the at least one free radical initiator I.

All types of free radical initiators that that are known to undergo decomposition upon exposure to sufficient amount of energy, such as radiation, heat, or the like to generate radicals capable of initiating the desired curing (crosslinking) reactions are in principle considered suitable for use as the at least one free radical initiator I.

According to one or more embodiments, the at least one free radical initiator I is an azo-initiator AI, preferably selected from the group consisting of azonitrile compounds, alkylazo compounds, and azoamide compounds.

Although some of the compounds used in the present invention are characterized as useful for specific functions, it should be understood that the use of these compounds is not limited to their typical functions. For example, the at least one azo initiator AI may serve not only as a free radical initiator for the cross-linking reactions, but also as a chemical blowing agent for the foaming process.

Suitable azo initiators are essentially inert at normal room temperature (23° C.) and exhibit an activation temperature suitable for the intended purpose. For example, in case the thermally expandable composition is used for providing a baffle and/or reinforcement element in automotive manufacturing, an activation temperature in the range of 90-250° C. is typically preferred. Furthermore, it is advantageous that the at least one azo initiator AI has an activation temperature compatible with the decomposition temperature of the at least one chemical blowing agent BA. If the above mentioned two temperatures differ too much, it may be more difficult to obtain a thermally expandable composition with optimal performance and stability.

It may furthermore be advantageous that the at least one azo initiator AI has a half-life of 10 h at a temperature in the range of 55-120° C., as measured in toluene or in a similar non-polar solvent. For certain types of azo radical initiators, other solvents than toluene may be more suitable for use in measurement of the half-life, such as substituted (for example, chlorinated) benzene, methanol, or water. The choice of the suitable solvent depends mainly on the solubility of the azo initiator in the respective solvent. It is furthermore advantageous that the at least one azo initiator AI is compatible and/or miscible with the polymer matrix of the thermally expandable composition. In some cases the compatibility of the azo initiator with the polymer matrix can be further improved by using processing aids and other compatibilizing additives.

Suitable azo initiators to be used as the at least one azo initiator AI include, for example, 4,4'-azobis(4-cyanovaleric acid), 1,1'-azobis(cyclohexane-1-carbonitrile) (ACHN), azobisisobutyronitrile (AIBN), 2,2'-azobis(2-methylpropionamidine), 2,2'-azobis(2-methylpropionitrile), di-tert-butyl-4,4-azobis-(4-cyanoperoxypentanoate), di-tert-butyl-4,4-azobis-(4-cyanoperoxyhexanoate), di-tert-butyl-4,4-azobis-(4-cyanoperoxyheptanoate), dimethyl 2,2'-azobis(2-methylpropionate), 2,2'-azobis(2-methylbutyronitrile), 2,2'-azobis(N-butyl-2-methylpropionamide), 2,2'-azobis(2,4-dimethylvaleronitrile), 2,2'-azobis(2-methylpropionamidine)dihydrochloride, 2,2'-azobis[N-(2-carboxyethyl)-2-methylpropionamidine]tetrahydrate, 2,2'-azobis[2-(2-imidazolin-2-yl)propane], 2,2'-azobis[2-methyl-N-(2-hydroxyethyl)propionamide].

According to one or more embodiments, the at least one azo initiator AI is selected from the group consisting of azobisisobutyronitrile (AIBN), 1,1'-azobis(cyclohexane-1-carbonitrile) (ACHN), and 2,2'-azobis[2-methyl-N-(2-hydroxyethyl)propionamide].

Other free radical initiators, such as peroxide initiators, are also suitable for use as the at least one free radical initiator I. According to one or more further embodiments, the at least one free-radical initiator I is a peroxide initiator PI. The thermally expandable composition may also comprise multiple different free radical initiators, for example, the at least one azo-initiator AI and the at least one peroxide initiator PI. Use of multiple different free radical initiators is, however, not preferred, although possible.

Suitable peroxide initiators are essentially inert at room temperature (23° C.) and exhibit an activation temperature suitable for the intended purpose. For example, if the thermally expandable composition is to be used for providing a baffle and/or reinforcement element in automotive manufacturing, an activation temperature of in the range of 90-250° C. is typically preferred. Furthermore, it is advantageous that the at least one peroxide initiator PI has an activation temperature compatible with the decomposition temperature of the at least one chemical blowing agent BA. If the above mentioned two temperatures differ too much, it may be more difficult to obtain a thermally expandable composition with optimal performance and stability.

It may furthermore be advantageous that the at least one peroxide initiator PI has a half-life of 10 h at a temperature in the range of 90-130° C., as measured in benzene or in a similar non-polar solvent. For certain types of peroxide initiators other solvents than benzene may be more suitable for use in measurement of the half-life, such as, for example, toluene, triethyl phosphate or dibutyl phthalate. For ultra-low temperature embodiments, i.e. those optimized for expansion between 120° C. and 150° C., peroxide initiators having a half-life of 10 h at temperatures in the range of 50-100° C. are preferred. It is furthermore advantageous that the at least one peroxide initiator PI is compatible and/or miscible with the polymer matrix of the thermally expandable composition. In some cases the compatibility of the peroxide initiator with the polymer matrix can be further improved by using processing aids and other compatibilizing additives.

Suitable peroxide initiators include, in particular organic peroxides. All types of organic peroxides that are known to undergo decomposition by heat to generate radicals capable of initiating the desired curing (crosslinking) reactions are in principle considered suitable for use as peroxide initiators.

According to one or more embodiments, the at least one peroxide initiator PI is an organic peroxide, preferably selected from the group consisting of, keton peroxides, diacyl peroxides, peresters, perketals, and hydroperoxides. Examples of preferred peroxides include cumene hydroperoxide, t-butyl peroxide, bis(t-butylperoxy)-diisopropyl benzene, di(t-butylperoxy isopropyl) benzene, dicumyl peroxide, t-butylperoxy benzoate, di-alkylperoxy dicarbonate, diperoxyketals (such as 1,1-di-t-butylperoxy-3,3,5-trimethyl cyclohexane), keton peroxides (such as methyl ethyl keton peroxide), and 4,4-di-t-butylperoxy-n-butyl valerate.

Preferred organic peroxides include 3,3,5,7,7-pentamethyl-1,2,4-trioxepane, 2,5-dimethyl-2,5-di(t-butylperoxy)-3-hexyne, di-t-butyl peroxide, 2,5-dimethyl-2,5-di(t-butylperoxy) hexane, t-butyl cumyl peroxide, di(t-butylperoxy isopropyl) benzene, dicumyl peroxide, butyl-4,4-di(t-butylperoxy) valerate, t-butylperoxy-2-ethylhexyl carbonate, 1,1-di(t-butylperoxy)-3,3,5-trimethyl cyclohexane, t-butylperoxy benzoate, di(4-methylbenzoyl) peroxide, and dibenzoyl peroxide.

Particularly preferred peroxides include dicumyl peroxide, and/or di(t-butylperoxyisopropyl) benzene, and/or 1,1-di(t-butylperoxy)-3,3,5-trimethyl cyclohexane.

These are commercially available, for example, under the trade names of Perkadox® BC-40B-PD from Akzo Nobel and Peroxan® DC-40 PK from Pergan (dicumyl peroxide); under the trade names of Perkadox® 14-40B-PD Akzo Nobel and Peroxan® BIB-40 P from Pergan (di(t-butylperoxyisopropyl) benzene); and under the trade name of Peroxan® PK295 from Pergan (di(t-butylperoxyisopropyl) benzene).

It may furthermore be advantageous that the at least one peroxide initiator PI is present in the thermally expandable composition as immobilized on a support material, such as silica, kaolin, and/or calcium carbonate, or other suitable materials. This approach may facilitate handling, dosage, and evenly distribution of the organic peroxide in the thermally expandable composition. Examples for such immobilized organic peroxides include, for example, 40 wt.-% dicumyl peroxide on calcium carbonate, 40 wt.-% di(t-butylperoxyisopropyl) benzene on clay and silica, and 40 wt.-% 1,1-di(t-butylperoxy)-3,3,5-trimethyl cyclohexane on calcium carbonate. In these embodiments, the expression "the amount of the at least one peroxide initiator PI" refers to the amount of the active substance contained in the thermally expandable composition excluding the amount of the support material on which the peroxide initiator, for example, an organic peroxide, has been immobilized.

According to one or more embodiments, the thermally expandable composition comprises the at least one free radical initiator I and further at least one co-agent comprising at least two (meth)acryloyl groups, preferably at least one multifunctional acrylate A, preferably having a molecular weight of less than 2'500 g/mol, more preferably less than 1'000 g/mol, and preferably having an acrylate functionality of at least 2 or 3, preferably at least 4 or 5, or more. The term "(meth)acryloyl" designates in the present disclosure both acryloyl and methacryloyl.

Such multifunctional acrylates can improve the crosslinking of polymer components contained in the thermally expansible composition and aid in obtaining a stable foam structure. The at least one multifunctional acrylate A, if used, preferably comprises 0.05-3.5 wt.-%, more preferably 0.1-2.5 wt.-%, even more preferably 0.25-1.5 wt.-% of the total weight of the thermally expandable composition.

Suitable multifunctional acrylates A with a functionality of 2 include ethylene glycol dimethacrylate, diethylene glycol dimethacrylate, triethylene glycol dimethacrylate, triethylene glycol diacrylate, tripropylene glycol dimethacrylate, 1,3-butanediol dimethacrylate, 1,4-butanediol dimethacrylate, 1,10-dodecanediol dimethacrylate, 1,6-hexandieol dimethacrylate, neopentylglycol dimethacrylate, and polybutylene glycol dimethacrylate, and hexanediol diacrylate. Most preferred acrylate with functionality of 2 is hexanediol diacrylate.

Suitable multifunctional acrylates A with a functionality of 3 or higher include glycerol triacrylate, pentaerythritol triacrylate, pentaerythritol trimethacrylate, trimethylolpropane triacrylate, trimethylolpropane trimethacrylate, tetramethylolmethane tetraacrylate, Di-(trimethylolpropane) tetraacrylate, pentaerythritol tetraacrylate, dipentaerythritol pentaacrylate, dipentaerythritol hexaacrylate, tri(2-methacryloxyethyl) trimellitate, tri(2-acryloxyethyl) isocyanurate, as well as their ethoxylated or propoxylated derivates. Most preferred multifunctional acrylate with functionality of 5 is dipentaerythritol pentaacrylate. Furthermore suitable are highly functional, hyperbranched acrylates with functionalities of between 6 and 16, or higher. Examples of such acrylates include hyperbranched polyester-polyacrylates.

Epoxy Functional Polymer EP

According to one or more embodiments, the thermoplastic polymer component P comprises at least one epoxy-functional polymer EP. Preferably, the at least one epoxy-functional polymer EP has an average of more than one epoxy group per molecule.

Suitable epoxy-functional polymers EP include, for example, olefin glycidyl (meth)acrylate copolymers, olefin alkyl (meth)acrylate glycidyl (meth)acrylate terpolymers, epoxy resins, and epoxy-functionalized polyurethane polymers. The term "(meth)acrylate" designates in the present disclosure both acrylate and methacrylate.

Suitable olefin glycidyl (meth)acrylate copolymers include, for example, copolymers of ethylene, propylene, or butylene with glycidyl acrylate (GA) or with glycidyl (meth)acrylate (GMA). Suitable olefin (meth)acrylate glycidyl (meth)acrylate terpolymers include, for example, terpolymers, in particular random terpolymers of ethylene and alkyl (meth)acrylate with glycidyl acrylate (GA) or with glycidyl methacrylate (GMA), wherein the alkyl group of the alkyl (meth)acrylate is preferably selected from the group consisting of methylene, ethylene, propylene, and butylene, in particular methylene or butylene.

Preferred olefin alkyl (meth)acrylate terpolymers include ethylene methyl acrylate glycidyl acrylate terpolymers (E/MA/GA), ethylene ethyl acrylate glycidyl acrylate terpolymers (E/EA/GA), ethylene propyl acrylate glycidyl acrylate terpolymers (E/PA/GA), ethylene butyl acrylate glycidyl acrylate terpolymers (E/BA/GA), ethylene methyl methacrylate glycidyl acrylate terpolymers (E/MMA/GA), ethylene ethyl methacrylate glycidyl acrylate terpolymers (E/EMA/GA), ethylene propyl methacrylate glycidyl acrylate terpolymers (E/PMA/GA), ethylene butyl methacrylate glycidyl acrylate terpolymers (E/BMA/GA), ethylene methyl acrylate glycidyl methacrylate terpolymers (E/MA/GMA), ethylene ethyl acrylate glycidyl methacrylate terpolymers (E/EA/GMA), ethylene propyl acrylate glycidyl methacrylate terpolymers (E/PA/GMA), ethylene butyl acrylate glycidyl methacrylate terpolymers (E/BA/GMA), ethylene methyl methacrylate glycidyl methacrylate terpolymers (E/MMA/GMA), ethylene ethyl methacrylate glycidyl methacrylate terpolymers (E/EMA/GMA), ethylene propyl methacrylate glycidyl methacrylate terpolymers (E/PMA/GMA), ethylene butyl methacrylate glycidyl methacrylate terpolymers (E/BMA/GMA).

According to one or more embodiments, the at least one epoxy-functional polymer EP comprises at least one olefin alkyl acrylate glycidyl (meth)acrylate terpolymer EP1, preferably selected from the group consisting of random terpolymers of ethylene, alkyl (meth)acrylate, and glycidyl methacrylate, wherein the alkyl group of the alkyl (meth) acrylate is preferably selected from the group consisting of methylene, ethylene, propylene, and butylene, in particular methylene or butylene.

According to one or more embodiments, the at least one olefin alkyl acrylate glycidyl (meth)acrylate terpolymer EP1 has a content of glycidyl methacrylate of 1-50 wt.-%, more preferably 2-25 wt.-% and/or a melt flow index, determined according to ISO 1133 (190° C./2.16 kg), of not more than 100 g/10 min, preferably not more than 50 g/10 min, more preferably not more than 25 g/10 min and/or a melting point as determined by DSC measurements conducted according to ISO 11357-3 of at or below 120° C., preferably at or below 110° C. more preferably at or below 100° C.

According to one or more embodiments, the at least one epoxy-functional polymer EP is selected from the group consisting of the at least one olefin alkyl acrylate glycidyl (meth)acrylate terpolymer EP1, preferably selected from the group consisting of random terpolymers of ethylene, alkyl (meth)acrylate, and glycidyl methacrylate, wherein the alkyl group of the alkyl (meth)acrylate is preferably selected from the group consisting of methylene, ethylene, propylene, and butylene, in particular methylene or butylene.

According to one or more embodiments, the at least one epoxy-functional polymer EP comprises at least one olefin glycidyl (meth)acrylate copolymer EP2, preferably selected from the group consisting of ethylene glycidyl (meth)acrylate copolymers, in particular ethylene glycidyl methacrylate copolymers.

According to one or more embodiments, the at least one epoxy-functional polymer EP is selected from the group consisting of the at least one olefin glycidyl (meth)acrylate copolymer EP2, preferably selected from the group consisting of ethylene glycidyl (meth)acrylate copolymers, in particular ethylene glycidyl methacrylate copolymers.

Suitable epoxy resins to be used as the at least one epoxy-functional polymer EP include solid and liquid epoxy resins having an average of more than one epoxy group per molecule and mixtures of these. The term "solid epoxy resin" designates epoxy resins having a glass transition temperature above the normal room temperature.

Suitable solid epoxy resins include those of the formula (III).

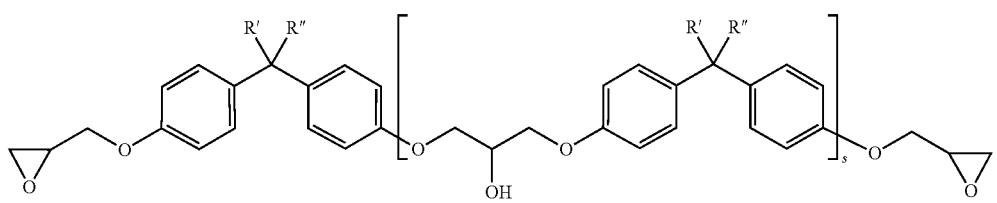

wherein the substituents R' and R" represent independently from one another either a hydrogen atom or a methyl group and the index s has a value of ≥1, preferably of ≥1.5, more preferably of 2 to 12.

Compounds of the formula (III) having an index s in the range from greater than 1 to 1.5 are known to a person skilled in the art as semisolid epoxy resins. For the purposes of the present disclosure, these are likewise considered to be solid epoxy resins.

Suitable solid epoxy resins are commercially available, for example, from Dow Chemical Company, from Huntsman International LLC, from Hexion Specialty Chemicals Inc., and from Olin Corporation.

Suitable liquid epoxy resins which, in particular, can be used together with solid epoxy resins of formula (III), include those of formula (IV)

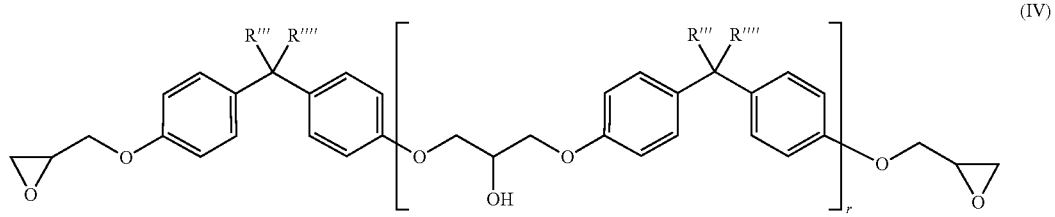

wherein the substituents R' and R" represent independent from one another either a hydrogen atom or a methyl group and the index r has a value of 0 to 1, preferably a value of 0 to less than 0.2.

Preferred liquid epoxy resins are thus diglycidyl ethers of bisphenol A (DGEBA), of bisphenol F and of bisphenol A/F (the expression 'A/F' refers here to a mixture of acetone with formaldehyde which is used as a reactant in the preparation thereof).

Suitable liquid epoxy resins are commercially available, for example, under the trade names of Araldite® GY 250, Araldite® PY 304, and Araldite® GY 282 (from Huntsman International LLC), and under the trade names of D.E.R.® 331 or D.E.R.® 330 (from Dow Chemical Company), and under the trade names of Epikote® 828 or Epikote® 862 (from Hexion Specialty Chemicals Inc.).

Further suitable solid epoxy resins are so-called epoxy novolac resins. Preferred epoxy novolac resins include those of formula (V)

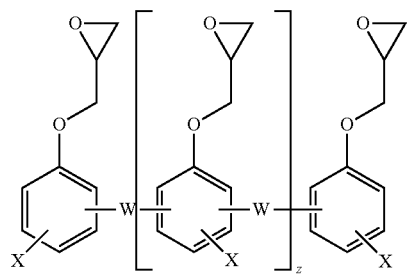

(V)

wherein the moiety X represents a hydrogen atom or a methyl group. The moiety W represents —CH$_2$— or a moiety of the formula (VI).

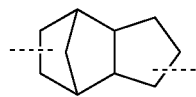

(VI)

Preferably, the index z represents a value of 0 to 7, in particular a value of 3. In particular, these are phenol or cresol novolacs (W represents —CH$_2$—).

Such epoxy novolac resins are commercially available, for example, under the trade names of EPN®, ECN®, and Tactix® 556 (from Huntsman International LLC) and under the trade name of D.E.N® (from Dow Chemical Company).

According to one or more embodiments, the at least one epoxy-functional polymer EP comprises at least one epoxy resin EP3, preferably selected from the group consisting of solid epoxy resin of formula (III), solid epoxy resin of formula (V), and mixtures of solid epoxy resin of formula (III) and/or (V) with liquid epoxy resin of formula (IV).

According to one or more embodiments, the at least one epoxy-functional polymer EP is selected from the group consisting of the at least one epoxy resin EP3, preferably selected from the group consisting of solid epoxy resin of formula (III), solid epoxy resin of formula (V), and mixtures of solid epoxy resin of formula (III) and/or (V) with liquid epoxy resin of formula (IV).

Further suitable epoxy resins to be used as the at least one epoxy-functional polymer EP include epoxy-functional polyurethane polymers of formula (VII)

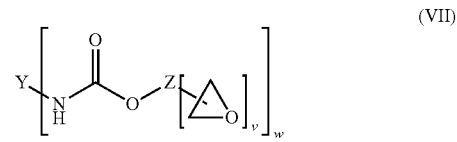

(VII)

wherein Y represents a w-valent radical of a linear or branched isocyanate-functional polyurethane polymer PU after the removal of the w terminal isocyanate groups:

Z represents a (1+v)-valent radical of an aliphatic, cycloaliphatic, aromatic or aral aliphatic epoxide E containing a primary or secondary hydroxyl group after the removal of the hydroxyl group and v epoxide groups;

v represents an integer with a value of 1, 2, or 3, preferably 2;

and w represents an integer with a value from 2 to 4.

The linear or branched isocyanate-functional polyurethane polymer PU has preferably a structure according to formula (VIII)

(VIII)

wherein Y and w have the same meaning as described further above.

The isocyanate-functional polyurethane polymer PU, represented in formula (VIII), may be obtained from the reaction of at least one polyisocyanate, preferably diisocyanate or triisocyanate, with at least one polyol, wherein the isocyanate groups are in stoichiometric excess over hydroxyl groups. The reaction can be carried out via known methods, preferably at temperatures of between 50 and 150° C., optionally in the presence of a catalyst.

Suitable polyols for the production of isocyanate-functional polyurethane polymer PU include, for example, polyoxyalkylene polyols, also referred to as polyether polyols, which are the polymerization product of ethylene oxide, 1,2-propylene oxide, 1,2- or 2,3-butylene oxide, tetrahydrofuran or mixtures thereof, optionally polymerized by means of a starter molecule with two or three active H atoms such as water or compounds with two or three OH groups, for example ethylene glycol or glycerol.

Preferred polyether polyols are polymerization products of ethylene oxide, 1,2-propylene oxide, 1,2- or 2,3-butylene oxide, tetrahydrofuran or mixtures thereof, particularly preferable being polypropylene oxides and polytetrahydrofurans. Suitable polytetrahydrofurans are commercially available, for example, from BASH under the trade names of PolyTHF®, for example PolyTHF®2000, PolyTHF®2500 CO, and PolyTHF®3000 CO. Suitable polypropylene oxides are commercially available, for example, from Shell under the trade name of Caradol®, such as Caradol®2000 and Caradol®ED56 and from Bayer under the trade name of Acclaim®, such as Acclaim® Polyol 2200, Acclaim® Polyol 12200, and Acclaim® Polyol 4200. Further suitable polyether polyols are commercially available from Dow Chemicals under the trade names of Voranol®1010L, Voranol® EP1900, and Voranol®CP4755.

Especially preferred polyether polyol is polytetrahydrofuran. Preferred polyether polyols have, for example, a weight average molecular weight (Mw) in the range from 500 to 5000 g/mol, more preferably 1000 to 3000 g/mol and particularly preferably in the range from 1500 to 2500 g/mol.

The OH-functionality of the polyether polyols used is preferably in the range of approximately 2, for example, in the range from 1.9 to 2.1. Optionally, a compound with an OH functionality of 3, such as, for example, trimethylolpropane, butoxylated trimethylolpropane (for example, Simulsol®TOMB), and/or pentaerythritol can be added to the polyether polyol in order to increase the OH functionality.

Furthermore suitable polyols include hydroxyl-terminated rubbers. One or more OH-terminated rubbers can be used, wherein the use of two OH-terminated rubbers, in particular two OH-terminated polybutadienes, are preferred. Here, OH-terminated rubbers are understood to refer, for example and preferably, to hydroxyl-terminated polybutadienes and to castor oil-based polyols, wherein hydroxyl-terminated polybutadienes are particularly preferable. Polyols based on castor oil include castor oil of various grades and castor oil derivatives. Commercially available hydroxyl-terminated polybutadienes are commercially available, for example, from Cray valley under the trade names of Poly Bd® and Krasol®, such as Krasol® LBH-P 2000 or Poly Bd® R45V; from Evonik under the trade name of Polyvest® HT; from Emerald materials under the trade name of Hypro® 2800X95 HTB. Castor oil-based polyols are commercially available, for example, Alberdingk Boley under the trade name of Albodur®; from Baker Castor Oil Company under the trade name of Polycine®, such as Polycine®-GR80.

The OH-functionality of the hydroxyl-terminated rubbers is preferably in the range from 1.7 to 2.2 for anionically produced types or from 2.2 to 2.8 for types produced by free radical polymerization.

Also suitable as polyols are polyhydroxy-terminated acrylonitrile/butadiene copolymers, for example, the ones prepared using carboxyl-terminated acrylonitrile/butadiene copolymers, such as the ones, which are commercially available from Emerald Materials under the trade names of Hypro® CTBN, as well as the ones prepared using epoxides or amino alcohols.

Furthermore suitable polyols for the production of isocyanate-functional polyurethane polymer PU include polyester polyols prepared, for example, from dihydric to trihydric alcohols such as, for example, 1,2-ethanediol, diethylene glycol, 1,2-propanediol, dipropylene glycol, 1,4-butanediol, 1,5-pentanediol, 1,6-hexanediol, neopentylglycol, glycerol, 1,1,1-trimethylolpropane or mixtures of the aforementioned alcohols, with organic dicarboxylic acids or their anhydrides or esters, such as, for example, succinic acid, glutaric acid, adipic acid, suberic acid, sebacic acid, dodecanedicarboxylic acid, maleic acid, fumaric acid, phthalic acid, isophthalic acid, terephthalic acid, and hexahydrophthalic acid, or mixtures of the aforementioned acids, and also polyester polyols from lactones such as ε-caprolactone.

Suitable as polyols for the production of isocyanate-functional polyurethane polymer PU are furthermore polycarbonate polyols of the kind obtainable by reacting, for example, the abovementioned alcohols, i.e. those used to synthesize the polyester polyols, with dialkyl carbonates, diaryl carbonates or phosgene. Also suitable are polyols of the kind obtained by reduction of dimerized fatty acids.

The isocyanate-functional polyurethane polymer PU may be obtained by using only one type of polyol. Preferred polyols for these embodiments are polyether polyols, in particular polytetrahydrofuran. It may however be advantageous to use a mixture of different types of polyols for the production of the polyurethane polymer PU. According to one or more embodiments, the isocyanate-functional polyurethane polymer PU comprises is obtained by using a polyether polyol, in particular polytetrahydrofuran, and a polybutadiene polyol.

Suitable polyisocyanates for the production of the isocyanate-functional polyurethane polymer PU include diisocyanates and triisocyanates. Suitable diisocyanates are aliphatic, cycloaliphatic, aromatic or araliphatic diisocyanates, in particular those, m which are commercially available, such as methylene diphenyl diisocyanate (MDI), hexamethylene diisocyanate (HDI), toluene diisocyanate (TDI), toluidine diisocyanate (TODI), isophorone diisocyanate (IPDI), trimethyl hexamethylene diisocyanate (TMDI), 2,5- or 2,6-bis(isocyanatomethyl)-bicyclo[2.2.1]heptane, 1,5-naphthalene diisocyanate (NDI), dicyclohexyl methyl diisocyanate (H12MDI), p-phenylene diisocyanate (PPDI), m-tetramethyl xylylene diisocyanate (TMXDI), as well as their dimers, wherein HDI, IPDI, MDI, TDI are preferred. Particularly preferable diisocyanates are aliphatic and cycloaliphatic diisocyanates, for example, HDI, H12MDI and IPDI.

Suitable triisocyanates are trimers or biurets of aliphatic, cycloaliphatic, aromatic or araliphatic diisocyanates, in particular the isocyanurates and biurets of the diisocyanates described above.

The isocyanate-functional polyurethane polymer PU is then end-capped with at least one monohydroxyl epoxide compound E according to formula (IX)

(IX)

wherein Z and v have the same meaning as described above.

The monohydroxyl epoxide compound E of formula (IX) is an aliphatic, cycloaliphatic, aromatic, or aral aliphatic epoxide containing one single primary or secondary hydroxyl group and from 1 to 3 epoxide groups.

The monohydroxyl epoxide compounds E of formula (IX) can be obtained, for example, by reacting polyols with epichlorohydrin. Depending on the reaction regime, the reaction of polyols with epichlorohydrin produces by-products including the corresponding monohydroxyl epoxide compounds in different concentrations. These can be isolated by routine separation operations.

Generally speaking, however, it is sufficient to use the product mixture obtained in the glycidylization reaction of polyols, comprising fully reacted polyol and polyol which has reacted partially to form the glycidyl ether. Examples of hydroxyl-containing epoxide compounds of this kind are butanediol monoglycidyl ether (contained in butanediol diglycidyl ether), hexanediol monoglycidyl ether (contained in hexanediol diglycidyl ether), cyclohexanedimethanol glycidyl ether, trimethylolpropane diglycidyl ether (contained as a mixture in trimethylolpropane triglycidyl ether), glycerol diglycidyl ether (contained as a mixture in glycerol triglycidyl ether), pentaerythritol triglycidyl ether (contained as a mixture in pentaerythritol tetraglycidyl ether). It is preferred to use trimethylolpropane diglycidyl ether, which occurs at a relatively high fraction in customarily prepared trimethylolpropane triglycidyl ether.

It is, however, also possible to use other, similar hydroxyl-containing epoxides, especially glycidol, 3-glycidyloxybenzyl alcohol or hydroxymethylcyclohexene oxide. Further preference is given to the liquid epoxy resins of formula (IV) as described above.

Preference for end-capping the isocyanate-functional polyurethane polymer PU extends to distillation residues which are obtained in the preparation of high-purity, distilled liquid epoxy resins. Distillation residues of this kind have a concentration of hydroxyl-containing epoxides which is up to three times higher than that of commercial undistilled liquid epoxy resins. Such resins are commercially available, for example under the trade name of Epilox® M850 from Leuna-Harze. Furthermore, it is also possible to use a wide variety of epoxides containing a β-hydroxy ether group, prepared by the reaction of (poly)epoxides with a substoichiometric amount of monofunctional nucleophiles such as carboxylic acids, phenols, thiols or secondary amines.

According to one or more embodiments, the at least one epoxy-functional polymer EP comprises at least one epoxy-functional polyurethane polymer EP4, preferably at least one epoxy-functional polyurethane polymer of formula (VII).

According to one or more embodiments, the at least one epoxy-functional polymer EP is selected from the group consisting of the at least one epoxy-functional polyurethane polymer EP4, preferably at least one epoxy-functional polyurethane polymer of formula (VII).

Acid Anhydride Functional Polymer AP

According to one or more embodiments, the thermoplastic polymer component P comprises at least one acid anhydride-functional polymer AP. Preferably, the at least one acid anhydride-functional polymer AP has an average of more than one acid anhydride group per molecule.

The at least one acid anhydride-functional polymer AP may contain either polymerized or grafted acid anhydride functionality, i.e. the acid anhydride moieties may be present as part of a polymer backbone or grafted onto a polymer as a side chain.

Suitable acid anhydride-functional polymers AP include maleic anhydride-functional polymers and tetrahydrophthalic anhydride-functional polymers, in particular maleic anhydride-functional polymers.

Suitable maleic anhydride-functional polymers include, for example, olefin maleic anhydride copolymers and olefin maleic anhydride terpolymers. Further suitable maleic anhydride-functional polymers include maleic anhydride grafted (co)polymers, such as maleic anhydride grafted olefin alkyl (meth)acrylate copolymers, maleic anhydride grafted olefin vinyl acetate copolymers, maleic anhydride grafted ethylene-α-olefin copolymers, maleic anhydride grafted propylene-α-olefin copolymers, maleic anhydride grafted polyethylene, maleic anhydride grafted polypropylene, and maleic anhydride grafted olefin copolymer elastomers, such as maleic anhydride grafted ethylene-propylene rubber (EPR).

Suitable olefin maleic anhydride copolymers include, for example, copolymers of maleic anhydride with ethylene, propylene, or butylene. Suitable olefin maleic anhydride terpolymers include, for example, olefin alkyl (meth)acrylate maleic anhydride terpolymers, such as terpolymers of ethylene and alkyl (meth)acrylate with maleic anhydride, wherein the alkyl group of the alkyl (meth)acrylate is preferably selected from the group consisting of methylene, ethylene, propylene, and butylene.

According to one or more embodiments, the at least one acid anhydride-functional polymer AP comprises at least one olefin alkyl acrylate maleic anhydride terpolymer AP1, preferably selected from the group consisting of random terpolymers of ethylene, alkyl (meth)acrylate, and maleic anhydride, wherein the alkyl group of the alkyl (meth)acrylate is preferably selected from the group consisting of methylene, ethylene, propylene, and butylene, more preferably methylene, ethylene, and butylene.

According to one or more embodiments, the at least one olefin alkyl acrylate maleic anhydride terpolymer AP1 has a content of maleic anhydride of 0.5-10 wt.-%, preferably 1-7.5 wt.-%, more preferably 1-5 wt.-%.

According to one or more embodiments, the at least one olefin alkyl acrylate maleic anhydride terpolymer AP1 has a melt flow index, determined according to ISO 1133 (190° C./2.16 kg), of not more than 100 g/10 min, preferably not more than 50 g/10 min, more preferably not more than 35 g/10 min and/or a melting point as determined by DSC measurements conducted according to ISO 11357-3 of at or below 125° C., preferably at or below 110° C., more preferably at or below 100° C.

According to one or more embodiments, the at least one acid anhydride-functional polymer AP is selected from the group consisting of the at least one olefin alkyl acrylate maleic anhydride terpolymer AP1, preferably selected from the group consisting of random terpolymers of ethylene, alkyl (meth)acrylate, and maleic anhydride, wherein the alkyl group of the alkyl (meth)acrylate is preferably selected from the group consisting of methylene, ethylene, propylene, and butylene, more preferably methylene, ethylene, and butylene.

According to one or more embodiments, the at least one acid anhydride-functional polymer AP comprises at least one olefin maleic anhydride copolymer AP2, preferably selected from the group consisting of copolymers of ethylene, propylene, and butylene with maleic hydride, in particular ethylene maleic anhydride copolymers.

According to one or more embodiments, the at least one acid anhydride-functional polymer AP is selected from the group consisting of the at least one olefin maleic anhydride copolymer AP2, preferably selected from the group consisting of copolymers of ethylene, propylene, and butylene with maleic hydride, in particular ethylene maleic anhydride copolymers.

According to one or more embodiments, the at least one acid anhydride-functional polymer AP comprises at least one maleic anhydride grafted (co)polymer AP3, preferably selected from the group consisting of maleic anhydride grafted olefin alkyl (meth)acrylate copolymers, maleic anhydride grafted olefin vinyl acetate copolymers, maleic anhydride grafted ethylene-α-olefin copolymers, maleic anhydride grafted propylene-α-olefin copolymers, maleic anhydride grafted polyethylene, maleic anhydride grafted polypropylene, and maleic anhydride grafted olefin copolymer elastomers, more preferably from the group consisting of maleic anhydride grafted olefin vinyl acetate copolymers, maleic anhydride grafted polyethylene, and maleic anhydride grafted polypropylene.

According to one or more embodiments, the at least one maleic anhydride grafted (co)polymer AP3 has a content of maleic anhydride of 0.1-10 wt.-%, preferably 0.1-5 wt.-%, more preferably 0.1-3.5 wt.-%, even more preferably 0.1-2.5 wt.-%, in particular 0.1-1.5 wt.-%.

According to one or more embodiments, the at least one maleic anhydride grafted (co)polymer AP3 has a melt flow index, determined according to ISO 1133 (190° C./2.16 kg), of not more than 100 g/10 min, preferably not more than 50 g/10 min, more preferably not more than 35 g/10 min and/or a melting point as determined by DSC measurements conducted according to ISO 11357-3 of at or below 145° C., preferably at or below 125° C., more preferably at or below 120° C.

According to one or more embodiments, the at least one acid anhydride-functional polymer AP is selected from the group consisting of the at least one maleic anhydride grafted (co)polymer AP3, preferably selected from the group consisting of maleic anhydride grafted olefin alkyl (meth)acrylate copolymers, maleic anhydride grafted olefin vinyl acetate copolymers, maleic anhydride grafted ethylene-α-olefin copolymers, maleic anhydride grafted propylene-α-olefin copolymers, maleic anhydride grafted polyethylene, maleic anhydride grafted polypropylene, and maleic anhydride grafted olefin copolymer elastomers, more preferably from the group consisting of maleic anhydride grafted olefin vinyl acetate copolymers, maleic anhydride grafted polyethylene, and maleic anhydride grafted polypropylene.

Thermoplastic Polymer TP

According to one or more embodiments, the thermoplastic polymer component P comprises at least one thermoplastic polymer TP. It goes without saying that the at least one thermoplastic polymer TP is different from the at least one epoxy-functional polymer EP and the at least one acid anhydride-functional polymer AP.

Suitable thermoplastic polymers TP include, for example, styrene-butadiene copolymers, styrene-isoprene copolymers, ethylene-vinyl acetate copolymers (EVA), olefin (meth)acrylate copolymers, olefin alkyl (meth)acrylate copolymers, olefin (meth)acrylic acid copolymers, polyolefins, and halogenated polyolefins, such as polyvinyl chloride (PVC). Suitable olefin (meth)acrylate copolymers and olefin alkyl (meth)acrylate copolymers include, for example, ethylene-ethyl acrylate copolymers, ethylene-butyl acrylate copolymers (EBA), and ethylene-2-ethylhexyl acrylate copolymers.

Suitable thermoplastic polymers TP may contain unsaturated olefinic bonds and they can also contain functional groups other than epoxide groups or acid anhydride groups, such as halogen, nitrile, thiol, hydroxyl, or carboxyl groups. It is however preferred that the at least one thermoplastic polymer TP is free of functional groups, which may interfere with the curing mechanism of the thermally expandable composition. This approach offers a better controllability of the curing mechanism and secondary properties such as the adhesion properties.

According to one or more embodiments, the at least one thermoplastic polymer TP is a non-functionalized thermoplastic polymer, preferably selected from the group consisting of ethylene-vinyl acetate copolymers, olefin (meth)acrylate copolymers, olefin alkyl (meth)acrylate copolymers, and olefin (meth)acrylic acid copolymers, more preferably from the group consisting of olefin (meth)acrylate copolymers and olefin alkyl (meth)acrylate copolymers, wherein the alkyl group of the olefin alkyl (meth)acrylate copolymer is preferably selected from the group consisting of methylene, ethylene, propylene, and butylene, more preferably butylene.

According to one or more embodiments, the at least one thermoplastic polymer TP has a melt flow index determined according to ISO 1133 (190° C./2.16 kg) of not more than 200 g/10 min, preferably not more than 150 g/10 min, even more preferably not more than 125 g/10 min and/or a melting point as determined by DSC measurements conducted according to ISO 11357-3 of at or below 125° C., preferably at or below 110° C., more preferably at or below 100° C.

According to one or more embodiments, the at least one thermoplastic polymer TP comprises at least one first non-functionalized thermoplastic polymer TP1 and at least one second non-functionalized thermoplastic polymer TP2 different from the at least one first non-functionalized thermoplastic polymer TP1 wherein the first and second non-functionalized thermoplastic polymers TP1 and TP2 are preferably selected from the group consisting of ethylene-vinyl acetate copolymers, olefin (meth)acrylate copolymers, olefin alkyl (meth)acrylate copolymers, and olefin (meth)acrylic acid copolymers, more preferably from the group consisting of olefin (meth)acrylate copolymers and olefin alkyl (meth)acrylate copolymers, wherein the alkyl group of the olefin alkyl (meth)acrylate copolymer is preferably selected from the group consisting of methylene, ethylene, propylene, and butylene, more preferably butylene According to one or more embodiments, the at least one first non-functionalized thermoplastic polymer TP1 has a melt flow index determined according to ISO 1133 (190° C./2.16 kg) of not more than 25 g/10 min, more preferably not more than 15 g/10 min, even more preferably not more than 10 min, in particular 1-10 g/10 min and/or the at least one second non-functionalized thermoplastic polymer TP2 has a melt flow index determined according to ISO 1133 (190° C./2.16 kg) of at least 15 g/10 min, more preferably at least 20 g/10 min, even more preferably at least 25 g/10 min, in particular 25-150 g/10 min, preferably 30-100 g/10 min.

According to one or more embodiments, the weight ratio of the amount of the at least one first non-functionalized thermoplastic polymer TP1 and the amount of the at least one second non-functionalized thermoplastic polymer TP2 is in the range of from 5:1 to 1:3, preferably from 3:1 to 1:2, more preferably from 2.5:1 to 1:1.

According to one or more embodiments, the at least one thermoplastic polymer TP is selected from the group consisting of the at least one first non-functionalized thermoplastic polymer TP1 and the at least one second non-functionalized thermoplastic polymer TP2, wherein the first and second non-functionalized thermoplastic polymers TP1 and TP2 are preferably selected from the group consisting of ethylene-vinyl acetate copolymers, olefin (meth)acrylate copolymers, olefin alkyl (meth)acrylate copolymers, and olefin (meth)acrylic acid copolymers, more preferably from the group consisting of olefin (meth)acrylate copolymers and olefin alkyl (meth)acrylate copolymers.

According to one or more further embodiments, the thermoplastic polymer component P is composed of the at least one epoxy-functional polymer EP or of the at least one acid anhydride-functional polymer AP. According to one or more further embodiments, the thermoplastic polymer component P is composed of the at least one thermoplastic polymer TP.

According to one or more further embodiments, the thermoplastic polymer component P is composed of the at least one epoxy-functional polymer EP and the at least one acid anhydride-functional polymer AP, wherein the ratio of the amount of the at least one epoxy-functional polymer EP to the amount of the at least one acid anhydride-functional polymer AP is preferably in the range of from 0.3:1 to 3:1, more preferably from 0.5:1 to 2:1.

According to one or more further embodiments, the thermoplastic polymer component P is composed of the at least one epoxy-functional polymer EP and the at least one acid anhydride-functional polymer AP, wherein the thermally expandable composition is essentially free of free-radical cross-linkers and wherein the ratio of the amount of the at least one epoxy-functional polymer EP to the amount of the at least one acid anhydride-functional polymer AP is preferably in the range of from 0.3:1 to 3:1, more preferably from 0.5:1 to 2:1.

The expression "essentially free of free-radical cross-linkers" is understood to mean that the amount of such substances, which are able to cross-link polymers by free-radical curing mechanism is preferably less than 0.2 wt.-%, more preferably less than 0.1 wt.-%, even more preferably less than 0.05 wt.-%, based on the total weight of the thermally expandable composition.

According to one or more further embodiments, the thermoplastic polymer component P comprises the at least one epoxy-functional polymer EP or the at least one acid anhydride-functional polymer AP, and the at least one thermoplastic polymer TP, wherein the at least one thermoplastic polymer TP preferably comprises at least 50 wt.-%, more preferably at least 60 wt.-%, even more preferably at least 70 wt.-%, still more preferably at least 75 wt.-% of the total weight of the thermoplastic polymer component P.

According to one or more further embodiments, the thermoplastic polymer component P comprises or is composed of the at least one epoxy-functional polymer EP, the at least one acid anhydride-functional polymer AP, and the at least one thermoplastic polymer TP, wherein the at least one thermoplastic polymer TP preferably comprises at least 25 wt.-%, more preferably at least 35 wt.-%, even more preferably at least 40 wt.-%, still more preferably at least 45 wt.-%, in particular at least 50 wt.-% of the total weight of the polymer component P.

According to one or more further embodiments, component a) of the thermally expandable composition comprises or is composed of the thermoplastic polymer component P and the thermoplastic polymer component P is composed of the at least one thermoplastic polymer TP, wherein the thermally expandable composition further comprises the at least one free radical initiator I and optionally the at least one multifunctional acrylate A. In these embodiments, in particular wherein component a) of the thermally expandable composition is composed of the polymer component P, it may furthermore be preferred that component c) of the thermally expandable composition is composed of the at least one free radical initiator I.

According to one or more further embodiments, component a) of the thermally expandable composition comprises or is composed of the elastomer component E.

According to one or more embodiments, the elastomer component E comprises at least 2.5 wt.-%, preferably at least 5 wt.-%, more preferably at least 10 wt.-%, even more preferably at least 15 wt.-%, of the total weight of the thermally expandable composition.

According to one or more embodiments, the elastomer component E comprises 2.5-35 wt.-%, preferably 5-30 wt.-%, more preferably 7.5-25 wt.-%, even more preferably 10-25 wt.-%, still more preferably 10-20 wt.-%, most preferably 12.5-20 wt.-% of the total weight of the thermally expandable composition.

Principally all types of natural and synthetic elastomers are suitable for use as the elastomer component E. According to one or more embodiments, elastomer component E comprises at least one solid rubber SR. The term "solid rubber" designates in the present document rubbers that are solid at a temperature of 25° C.

Solid Rubber SR

Suitable solid rubbers SR include, for example, butyl rubber, halogenated butyl rubber, styrene-butadiene rubber (SBR), ethylene-propylene rubber (EPR), ethylene-propylene diene monomer rubber (EPDM), natural rubber, polychloroprene rubber, cis-1,4-polyisoprene, polybutadiene rubber, isoprene-butadiene rubber, styrene-isoprene-butadiene rubber, nitrile rubber, nitrile-butadiene rubber, and acrylonitrile rubber.

According to one or more embodiments, the at least one solid rubber SR is selected from the group consisting of butyl rubber, halogenated butyl rubber, styrene-butadiene rubber (SBR), ethylene-propylene rubber (EPR), ethylene-propylene diene monomer rubber (EPDM), natural rubber, cis-1,4-polyisoprene, and polybutadiene rubber.

Preferred solid rubbers SR have an average molecular weight (Mn) of at least 100'000 g/mol, such as at least 125'000 g/mol.

According to one or more embodiments, the at least one solid rubber SR comprises at least one solid styrene-butadiene rubber SR1.

According to one or more embodiments, the at least one solid styrene-butadiene rubber SR1 is an emulsion-polymerized styrene-butadiene rubber.

These can be divided into two types, cold rubber and hot rubber depending on the emulsion polymerization temperature, but hot rubbers (hot type) are preferred.

According to one or more embodiments, the at least one solid styrene-butadiene rubber SR1 has a styrene content of 1-60 wt.-%, more preferably 2-50 wt.-%, even more preferably 10-40 wt.-%, such as 15-40 wt.-%, most preferably 20-35 wt.-%.

According to one or more embodiments, the at least one solid styrene-butadiene rubber SR1 has a Mooney viscosity (ML 1+4 at 100° C.) of 25-150 MU (Mooney units), more preferably 30-100 MU, even more preferably 35-80 MU.

Preferred solid styrene-butadiene rubbers SR1 include pre-crosslinked styrene-butadiene elastomers, which are commercially available, for example, under the trade name of Petroflex® SBR 1009A, 1009S and 1018 elastomers, manufactured by Petroflex/Lanxess, using either rosin or fatty acids soaps as emulsifier and coagulated by the salt-acid method, and SBR 1009, 1009A, 1502, and 4503 elastomers, manufactured by Lion Elastomers, by hot emulsion polymerization with divinylbenzene.

According to one or more embodiments, the at least one solid rubber SR is selected from the group consisting of the at least one solid styrene-butadiene rubber SR1.

According to one or more embodiments, the at least one solid rubber SR comprises at least one solid butyl rubber SR2.

The term "butyl rubber" designates in the present document a polymer derived from a monomer mixture containing a major portion of a $C_4$ to $C_7$ monoolefin monomer, preferably an isoolefin monomer and a minor portion, such as not more than 30 wt.-%, of a $C_4$ to $C_{14}$ multiolefin monomer, preferably a conjugated diolefin.

The preferred $C_4$ to $C_7$ monoolefin monomer may be selected from the group consisting of isobutylene, 2-methyl-1-butene, 3-methyl-1-butene, 2-methyl-2-butene, 4-methyl-1-pentene, and mixtures thereof.

The preferred $C_4$ to $C_{14}$ multiolefin comprises a $C_4$ to $C_{10}$ conjugated diolefin. The preferred $C_4$ to $C_{10}$ conjugated diolefin may be selected from the group comprising isoprene, butadiene, 2,4-dimethylbutadiene, piperyline, 3-methyl-1,3-pentadiene, 2,4-hexadiene, 2-neopentyl-1,3-butadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene and mixtures thereof.

According to one or more embodiments, the at least one solid butyl rubber SR2 is derived from a monomer mixture containing from about 80 wt.-% to about 99 wt.-% of a $C_4$ to $C_7$ monoolefin monomer and from about 1.0 wt.-% to about 20 wt.-% of a $C_4$ to $C_{14}$ multiolefin monomer. More preferably, the monomer mixture contains from about 85 wt.-% to about 99 wt.-% of a $C_4$ to $C_7$ monoolefin monomer and from about 1.0 wt.-% to about 10 wt.-% of a $C_4$ to $C_{14}$ multiolefin monomer. Most preferably, the monomer mixture contains from about 95 wt.-% to about 99 wt.-% of a $C_4$ to $C_7$ monoolefin monomer and from about 1.0 wt.-% to about 5.0 wt.-% of a $C_4$ to $C_{14}$ multiolefin monomer.

Preferably, the at least one solid butyl rubber SR2 is derived from a monomer mixture comprising from about 97 wt.-% to about 99.5 wt.-% of isobutylene and from about 0.5 wt.-% to about 3 wt.-% of isoprene.

It is furthermore possible to include an optional third monomer to produce a butyl terpolymer. For example, it is possible to include a styrenic monomer in the monomer mixture, preferably in an amount up to about 15 wt.-% of the monomer mixture. The preferred styrenic monomer may be selected from the group comprising p-methylstyrene, styrene, α-methylstyrene, p-chlorostyrene, p-methoxystyrene, indene, indene derivatives and mixtures thereof. The most preferred styrenic monomer may be selected from the group comprising styrene, p-methylstyrene and mixtures thereof. Other suitable copolymerizable termonomers will be apparent to those of skill in the art.

According to one or more embodiments, the at least one solid butyl rubber SR2 has a Mooney Viscosity (ML 1+8 at 125° C.) of not more than 125 MU (Mooney units), more preferably not more than 100 MU, even more preferably not more than 85 MU. The Mooney viscosity refers to the viscosity measure of rubbers. It is defined as the shearing torque resisting rotation of a cylindrical metal disk (or rotor) embedded in rubber within a cylindrical cavity. The dimensions of the shearing disk viscometer, test temperatures, and procedures for determining Mooney viscosity are defined in ASTM D1646 standard.

According to one or more embodiments, the at least one solid butyl rubber SR2 is a halogenated butyl rubber, preferably a chlorinated butyl rubber or a brominated butyl rubber, especially preferred a brominated butyl rubber.

Preferred halogenated butyl rubbers comprise a halogen in an amount of at least 0.1 wt.-%, in particular 0.1-10.0 wt.-%, preferably 0.1-8.0 wt.-%, more preferably 0.5-8.0 wt.-%, even more preferably 0.5-4.0 wt.-%, most preferably 1.5-3.0 wt.-%, based on the weight of the butyl rubber.

According to one or more embodiments, the at least one solid butyl rubber SR2 is a mixture of a solid halogenated butyl rubber and a solid non-halogenated butyl rubber, wherein the solid halogenated butyl rubber is preferably a brominated butyl rubber. Preferably, in these embodiments the weight ratio of the amount of the solid halogenated butyl rubber and the amount of the solid non-halogenated butyl rubber is in the range of 20-0.1, more preferably 15-0.5, even more preferably 12.5-1, most preferably 10-1.

According to one or more embodiments, the at least one solid rubber SR is selected from the group consisting of the at least one solid butyl rubber SR2. According to one or more embodiments, the at least one solid rubber SR comprises at least one solid polybutadiene rubber SR3.

The term "polybutadiene rubber" designates in the present document a polymer obtained from the polymerization of the 1,3-butadiene monomer. A According to one or more embodiments, the at least one solid polybutadiene rubber SR3 has a 1,4 cis-bond content of at least 40 wt.-%, more preferably greater than 80 wt.-%, even more preferably greater than 95 wt.-%.

According to one or more embodiments, the at least one solid polybutadiene rubber SR3 has a Mooney Viscosity (ML 1+4 at 100° C.) of 20-100 MU (Mooney units), more preferably 25-80 MU, even more preferably 30-60 MU.

According to one or more embodiments, the at least one solid rubber SR is selected from the group consisting of the at least one solid polybutadiene rubber SR3.

According to one or more embodiments, component a) of the thermally expandable composition comprises or is composed of the elastomer component E, wherein the thermally expandable composition further comprises a vulcanization system VS. In these embodiments, in particular wherein component a) of the thermally expandable composition is composed of the elastomer component E, it may furthermore be preferred that component c) of the thermally expandable composition is composed of the vulcanization system VS.

The type of the vulcanization system VS is not particularly restricted. Vulcanization systems based on elementary sulfur as well as those not containing elementary sulfur are considered suitable.

In case a vulcanization system based on elementary sulfur is used, the system preferably contains pulverulent sulfur, more preferably at least one sulfur compound selected from the group consisting of powdered sulfur, precipitated sulfur, high dispersion sulfur, surface-treated sulfur, and insoluble sulfur.

Preferred vulcanization systems based on elementary sulfur comprise 1-15 wt.-%, more preferably 5-10 wt.-% of pulverulent sulfur, preferably at least one sulfur compound selected from the group consisting of powdered sulfur, precipitated sulfur, high dispersion sulfur, surface-treated sulfur, and insoluble sulfur, based on the total weight of the vulcanization system.

According to one or more embodiments, the vulcanization system VS is a vulcanization system without elementary sulfur.

Preferred vulcanization systems without elementary sulfur comprise at least one vulcanization agent and optionally at least one inorganic vulcanization accelerator and/or at least one inorganic vulcanization accelerator.

Suitable vulcanization agents for vulcanization systems without elementary sulfur include, for example, phenolic resins, bisazidoformates, polyfunctional amines, para-quinone dioxime, para-benzoquinone dioxime, para-quinone dioxime dibenzoate, p-nitrosobenzene, dinitrosobenzene, thiuram compounds, bismaleimides, dithiols, zinc oxide as well as vulcanization systems crosslinked with (blocked) diisocyanates.

Suitable organic vulcanization accelerators to be used in the vulcanization systems without elementary sulfur include thiocarbamates, dithiocarbamates (in the form of their ammonium or metal salts), xanthogenates, thiuram compounds (monosulfides and disulfides), thiazole compounds, aldehyde-amine accelerators, for example hexamethylenetetramine, and guanidine accelerators.

Suitable inorganic vulcanization accelerators to be used in the vulcanization systems without elementary sulfur include, for example, zinc compounds, in particular zinc salts of fatty acids, basic zinc carbonates, and zinc oxide.

According to one or more embodiments, the vulcanization system VS is a vulcanization system without elementary sulfur containing at least one vulcanization agent selected from the group consisting of para-quinone dioxime, para-benzoquinone dioxime, para-quinone dioxime dibenzoate, p-nitrosobenzene, dinitrosobenzene, and thiuram compounds, preferably from the group consisting of para-quinone dioxime, para-benzoquinone dioxime, para-quinone dioxime dibenzoate, tetramethyl thiuram disulfide (TMTD), and tetrabenzylthiuram disulfide (TBzTD), and preferably further containing at least one organic vulcanization accelerator and/or at least one an inorganic vulcanization accelerator.

According to one or more embodiments, the at least one organic vulcanization accelerator is selected from the group consisting of cyclohexylbenzothiazole sulfonamide, mercaptobenzothiazole sulfide (MBTS), diphenyl guanidine, and zinc dimethyldithiocarbamate.

According to one or more embodiments, the at least one inorganic vulcanization accelerator is selected from the group consisting of zinc salts of fatty acids, basic zinc carbonates, and zinc oxide, more preferably zinc oxide.

According to one or more embodiments, the vulcanization system VS without elementary sulfur comprises 1-15 wt.-%, more preferably 1-12.5 wt.-%, even more preferably 2-10 wt.-%, most preferably 3.5-10 wt.-% of the total weight of the thermally expandable composition.

According to one or more preferred embodiments, the vulcanization system VS without elementary sulfur comprises 10-40 wt.-%, preferably 20-35 wt.-% of at least one vulcanization agent, preferably selected from the group consisting of para-quinone dioxime, para-benzoquinone dioxime, para-quinone dioxime dibenzoate, tetramethyl thiuram disulfide (TMTD), and tetrabenzylthiuram disulfide (TBzTD), and 10-40 wt.-%, preferably 20-35 wt.-% of at least one organic vulcanization accelerator, preferably selected from the group consisting of cyclohexylbenzothiazole sulfonamide, mercaptobenzothiazole sulfide (MBTS), diphenyl guanidine, and zinc dimethyldithiocarbamate and/or 10-40 wt.-%, preferably 20-35 wt.-% of at least one inorganic vulcanization accelerator, preferably selected from the group consisting of zinc salts of fatty acids, basic zinc carbonates, and zinc oxide, more preferably zinc oxide, wherein all the proportions are based on total weight of the vulcanization system VS.

Apart from the essential and optional ingredients listed above, the thermally expandable composition may contain other compounds commonly used in such compositions and known to the ordinarily person skilled in the art. These include, for example, tackifying resins, fillers, colorants, dispersion aids or homogenizers, stabilizers, and the like.

The term "tackifying resin" designates in the present document resins that in general enhance the adhesion and/or tackiness of a composition. The term "tackiness" refers in the present document to the property of a substance of being sticky or adhesive by simple contact, which can be measured, for example, as a loop tack. Preferred tackifying resins are tackifying at a temperature of 25° C. Such tackifying resins lead to good adhesion on metal substrates, especially oiled metal substrates, both before and after foaming of the thermally expandable composition.

Suitable tackifying resins to be used in the thermally expandable composition have a relatively low average molecular weight (Mn), such as not more than 5'000 g/mol, in particular not more than 3'500 g/mol, preferably not more than 2'500 g/mol and a softening point, determined by a Ring and Ball method according to DIN EN 1238, of at or below 180° C., preferably at or below 160° C., more preferably at or below 150° C. Suitable tackifying resins include, in particular, synthetic resins, natural resins, and chemically modified natural resins.

The term "synthetic resin" designates in the present disclosure compounds obtained from the controlled chemical reactions such as polyaddition or polycondensation between well-defined reactants that do not themselves have the characteristic of resins. Monomers that may be polymerized to synthesize the synthetic resins may include aliphatic monomer, cycloaliphatic monomer, aromatic monomer, or mixtures thereof. Suitable aliphatic monomers may include $C_4$, $C_5$, and $C_6$ paraffins, olefins, and conjugated diolefins. Examples of aliphatic monomers or cycloaliphatic monomers include butadiene, isobutylene, 1,3-pentadiene, 1,4-pentadiene, cyclopentane, 1-pentene, 2-pentene, 2-methyl-1-pentene, 2-methyl-2-butene, 2-methyl-2-pentene, isoprene, cyclohexane, 1-3-hexadiene, 1-4-hexadiene, cyclopentadiene, and dicyclopentadiene. Examples of aromatic monomer include $C_8$, $C_9$, and $C_{10}$ aromatic monomers. Typical aromatic monomers include, styrene, alphamethyl styrene, vinyl toluene, methoxy styrene, tertiary butyl styrene, chlorostyrene, coumarone, and indene monomers including indene, and methyl indene, and combinations thereof.

Suitable synthetic resins include, for example, hydrocarbon resins, coumarone-indene resins, polyindene resins, polystyrene resins, vinyl toluene-alphamethyl styrene copolymer resins, and alphamethyl styrene resins.

The term "hydrocarbon resin" designates in the present disclosure synthetic resins made by polymerizing mixtures of unsaturated monomers obtained from petroleum based feedstocks, such as by-products of cracking of natural gas liquids, gas oil, or petroleum naphthas. These types of hydrocarbon resins are also known as "petroleum resins" or as "petroleum hydrocarbon resins". The hydrocarbon resins include also pure monomer aromatic resins, which are prepared by polymerizing aromatic monomer feedstocks that have been purified to eliminate color causing contaminants and to precisely control the composition of the product.

Suitable hydrocarbon resins are commercially available, for example, under the trade name of Wingtack®, Wingtack® Plus, Wingtack® Extra, and Wingtack® STS (all from Cray Valley); under the trade name of Escorez® 1000 series, Escorez® 2000 series, and Escorez® 5000 series (all from ExxonMobil Chemical); under the trade name of Novares® T series, Novares® TT series, Novares® TD series, Novares® TL series, Novares® TN series, Novares® TK series, and Novares® TV series (all from RUTGERS Novares GmbH); and under the trade name of Kristalex®, Plastolyn®, Piccotex®, Piccolastic® and Endex® (all from Eastman Chemicals).

Tackifying resins, if used, are preferably included in the thermally expandable composition in an amount of 2-20 wt.-%, preferably 4-15 wt.-%, more preferably 5-10 wt.-%, based on the total weight of the thermally expandable composition.

Suitable fillers include, for example, ground or precipitated calcium carbonate, lime, calcium-magnesium carbonate, talcum, gypsum, graphite, barite, pyrogenic or precipitated silica, silicates, mica, wollastonite, kaolin, feldspar, chlorite, bentonite, montmorillonite, dolomite, quartz, cristobalite, calcium oxide, aluminum hydroxide, magnesium oxide, hollow ceramic spheres, hollow glass spheres, hollow organic spheres, glass spheres, functionalized alumoxanes, and carbon black. Suitable fillers include both organically coated and also uncoated commercially available forms of the fillers included in the above presented list. Particularly suitable fillers include ground or precipitated calcium carbonate, calcium-magnesium carbonate, talcum, gypsum, graphite, barite, pyrogenic or precipitated silica, silicates, mica, wollastonite, carbon black, and mixtures thereof.

Fillers, if used, are preferably incorporated in the thermally expandable compositions in an amount of 1-20 wt.-%, more preferably 1-15 wt.-%, even more preferably 2.5-15 wt.-%, based on the total weight of the thermally expandable composition.

Colorants or dyes, such as pigments, for example on the basis of carbon black, may also be included in the thermally expandable composition. Their amount is preferably between 0.1-1 wt.-%, based on the total weight of the thermally expandable composition.

Preferably, the thermally expandable composition after curing has a volume increase compared to the uncured composition of at least 100%, preferably at least 150%, more preferably at least 250%, whereby the volume increase is determined using the DIN EN ISO 1183 method of density measurement (Archimedes principle) in deionised water in combination with sample mass determined by a precision balance.

According to one or more embodiments, the thermally expandable composition after curing has a volume increase compared to the uncured composition in the range of 100-3000%, preferably 150-2500%, more preferably 250-2000%, even more preferably 250-1750%.

The thermally expandable compositions according to the present invention can be produced by mixing the constituents in any suitable mixing apparatus, for example in a dispersion mixer, planetary mixer, such as planetary roller, extruder such as a twin screw extruder, kneader, such as a Buss, Banbury, or roller kneader, or a two-roll mill.

It may be advantageous to heat the constituents before or during mixing, either by applying external heat sources or by friction generated by the mixing process itself, in order to facilitate processing of the components into a homogeneously mixed mixture by decreasing viscosities and/or melting of individual components. However, care has to be taken, for example by temperature monitoring and using cooling devices where appropriate, not to exceed the activation temperatures of the at least one chemical blowing agent BA as well as the at least one free radical initiator I, if contained in the thermally expandable composition. The thus obtained thermally expandable composition is preferably essentially solid at normal room temperature (23° C.), meaning that it does not visibly deform at this temperature just by means of gravity during a period of at least 24 h.

After mixing of the constituents of the thermally expandable composition, the thus obtained composition may be shaped into its desired form by, for example, extruding, blow-molding, pelleting, injection molding, compression molding, punching, or stamping or using any other suitable process.

The thermally expandable composition of the present invention may be produced in a substantially one-step process, involving the addition of all constituents in a series and/or simultaneously. However, it may also be advantageous to provide the thermally expandable composition as a two-part system, or even multipart system. In these cases, the constituents of the thermally expandable composition are provided in separate air- and moisture impermeable packages or compartments of a single package and they are mixed with each other and optionally with other compounds at the time of use or immediately before the time of use of the thermally expandable composition. Such an approach may, for example, be taken to increase shelf life of the thermally expandable composition in places with demanding conditions (such as extraordinarily high temperatures), to optimize storage room demand and transport weight, or to enable providing tailor-made, modular compositions for different applications.

The thermally expandable compositions according to the present invention are storage stable at normal storage conditions. The term "storage stable" refers in the present disclosure to materials, which can be stored at specified storage conditions for long periods of time, such as at least one month, in particular at least 3 months, without any significant changes in the application related properties of the material. The "typical storage conditions" refer here to temperatures of not more than 60° C., in particular not more than 50° C.

The expansion of the thermally expandable composition of the present invention is triggered by heating. This means that the thermally expandable composition is activated by a heating step that exceeds its activation temperature and exhibits a duration long enough for the decomposition of the at least one chemical blowing agent BA (resulting in gas formation) to proceed until the expandable material has expanded and cured into its intended final (sufficiently expanded and stable) state. The optimal temperature and duration of the heating step (dwell time) depends on the embodiment of the thermally expandable composition, in particular on the composition of the at least one chemical blowing agent BA and the at least one free radical initiator I, if contained in the thermally expandable composition. The thermally expandable composition may have an activation temperature in the range of 120-250° C., preferably 140-220° C., and a dwell time of the heating step in the range of 5-90 min, preferably 10-60 min.

The preferences given above for the thermoplastic polymer component P, the elastomer component E, the at least one epoxy-functional polymer EP, the at least one acid anhydride-functional polymer AP, the at least one thermoplastic polymer TP, the at least one chemical blowing agent BA, the at least one free radical initiator I, the vulcanization system VS, and the at least one guanidine derivative G apply equally for all subjects of the present invention unless stated otherwise.

Another subject of the present invention is a baffle and/or a reinforcement element for hollow structures comprising or essentially consisting of the thermally expandable composition of the present invention.

Such elements are used to seal, baffle, and/or reinforce hollow structures, for example, a cavity in a hollow structural part of an automobile. Hollow parts in cars may include body components (for example panels), frame components (for example, hydroformed tubes), pillar structures (for example, A, B, C, or D-pillars), bumpers, roofs, or the like.

According to one or more embodiments, the baffle and/or reinforcement element for hollow structures essentially consists of the thermally expandable composition of the present invention. In these embodiments, it is advantageous to provide the element with such a shape that it can be easily fitted into and attached to the walls of the hollow structure to be baffled and/or reinforced.

Such shaped elements can be provided from the thermally expandable composition, for example, by injection molding, punching or stamping, or extrusion through a shape template.

According to one or more further embodiments, the baffle and/or reinforcement element further comprises a carrier on which the thermally expansible composition is deposited or attached. Such a design may be more cost-efficient and it may facilitate fixation of the baffle and/or reinforcement element on the walls of the structure to be baffled and/or reinforced, for example by incorporation of pins, bolts, or hooks on the carrier element. Furthermore, with a suitable design of the carrier element, the mechanical performance and stability of the baffle and/or reinforcement element can be improved.

The carrier of the baffle and/or reinforcement element, if used, may consist of any material that can be processed into a shape. Preferred materials for the carrier include polymeric materials, such as a plastic, elastomers, thermoplastics, blends thereof, and the like. Preferred thermoplastic materials include, without limitation, polymers such as polyurethanes, polyamides, polyesters, polyolefins, polysulfones, polyethylene terephthalates (PET), polyvinylchlorides (PVC), chlorinated polyolefins, and the like. Especially preferred are high-temperature stable polymers such as poly(phenyl ethers), polysulfones, polyethersulfones, polyamides, in particular polyamide 6, polyamide 6,6, polyamide 11, polyamide 12, and mixtures thereof. Other suitable materials for the carrier include metals, especially aluminum or steel, or naturally grown, organic materials, such as wood or other (pressed) fibrous materials. Also glassy or ceramic materials can be used. It is also possible to use any combination of such materials. It is also contemplated that such materials can be filled, for example, with fibers, minerals, clays, silicates, carbonates, combinations thereof, or the like, or be foamed.

The carrier element can further exhibit any shape or geometry. It can also consist of several, not directly connected parts. For example, it can be massive, hollow, or foamed, or it can exhibit a grid-like structure. The surface of the carrier element can typically be smooth, rough, or structured, according to the intended use of the baffle and/or reinforcement element.

Another subject of the present invention is a process for manufacturing a baffle and/or reinforcement element of the present invention, wherein the thermally expandable composition is injection-molded onto a carrier or co-extruded with a carrier.

The details of the manufacturing process of a baffle and/or reinforcement element of the present invention depends largely on the material of the carrier. If the material of the carrier can be (injection-) molded or extruded, the baffle and/or reinforcement element can be produced in a two-step injection-molding process or by co-extruding the carrier and the thermally expandable composition.

In case of a two-step injection molding process, the first step comprises injecting the material of the carrier into a mold. After solidification, the cavity of the injection molding tool is enlarged or adjusted or the injection-molded piece is transferred into another tool followed by a second step comprising injecting of the thermally expandable composition.

In case the carrier cannot be shaped by injection-molding or extrusion, for example, because it is composed of a metal or an alloy, the carrier may be first manufactured by a suitable process and then introduced into an injection-molding tool. The thermally expandable composition may then be injection-molded into the tool where the carrier was previously placed. Another possibility is to extrude the thermally expandable composition onto a pre-fabricated carrier element. Of course there is also the possibility of manufacturing the carrier and an element of the thermally expandable composition individually by any suitable process, and then attaching the element of the thermally expandable composition to the carrier by any suitable means, such as chemically or physically, for example by gluing or the like, or mechanically, for example, by bolting, screwing, or the like.

Another subject of the present invention is the use of the baffle and/or reinforcement element of the present invention for sealing, baffling, or reinforcing of a cavity or a hollow structure of a land-, water-, or air-vehicle, preferably an automotive vehicle, and/or a cavity of a building such that the transmission of noise, vibrations, humidity, and/or heat is reduced, and/or the structure surrounding said cavity or hollow structure is mechanically strengthened.

Still another subject of the present invention is a method for sealing, baffling and/or reinforcing a cavity or a hollow structure, wherein an element comprising a thermally expandable composition according the present invention is introduced into said cavity or hollow structure and subsequently expanded by heat and/or by UV-treatment such that said cavity or hollow structure is at least partially filled by the expanded composition.

The temperature of the thermal expansion step is preferably 140-250° C., more preferably of 150-220° C., even more preferably 150-200° C. Preferred duration of the thermal expansion step, i.e. preferred baking time of the thermally expandable composition, is 5-90 min, more preferably 10-60 min, even more preferably 10-30 min.

Regarding the thermal activation of the element comprising the thermally expandable composition when used in manufacturing of automotive vehicles, it is advantageous to couple the thermal activation with another process step involving heat treatment. An example of such a process step is the electrocoating (cathodic dip painting/coating) of the chassis of a car body.

EXAMPLES

The followings chemicals shown in Table 1 were used in formulating the thermally expandable compositions.

TABLE 1

| | |
|---|---|
| Polymer TP1 | Random copolymer of ethylene and butyl acrylate, 28-32 wt.-% of butyl acrylate, Melt Index (190° C./2.16 kg) of 1.5-2.5 g/10 min (ISO 1133) |
| Polymer TP2 | Random copolymer of ethylene and butyl acrylate, 33-37 wt.-% of butyl acrylate, Melt Index (190° C./2.16 kg) of 35-45 g/10 min (ISO 1133) |
| Polymer EP | Random copolymer of ethylene and glycidyl methacrylate, 6-10 wt.-% of glycidyl methacrylate, Melt Index (190° C./2.16 kg) of 0.5 g/10 min (ISO 1133) |
| Polymer AP | Random terpolymer of ethylene, acrylic ester, and maleic anhydride, 6 wt.-% of butyl acrylate, 3.1 wt.-% of maleic anhydride, Melt Index (190° C./2.16 kg) of 5 g/10 min (ISO 1133) |
| Filler | $CaCO_3$ powder, $d_{98}$ particle size 25-30 μm |
| Blowing agent BA | Aminoguanidinium oxalate, 99 wt.-% purity, particle size 250 mesh |
| Catalyst-1 | $^a$Substituted urea compound |
| Catalyst-2 | Dicyandiamide |
| Catalyst-3 | 1,2-dicyclohexyl-3-hexylguanidine |
| Catalyst-4 | (E)-1,2-bis(2,6-diisopropylphenyl)-3-hexylguanidine |
| Catalyst-5 | 1,2-diisopropyl-3-phenylguanidine |

$^a$Cellpaste K5, from Eiwa Chemical Ind. Co., Ltd.

Preparation of the Thermally Expandable Compositions

All inventive and non-inventive (reference) example compositions in this document were produced on standard production equipment suitable to compound thermoplastics with temperature control, i.e. twin screw extruder, Buss kneader or Banbury mixer. Polymers were mixed until homogeneous at a temperature 100-110° C. after which the system was cooled below activation of heat reactive raw materials (<90° C.). Heat reactive raw materials were then mixed into the system until homogeneous. The obtained material was subsequently hot-pressed into test samples that were used for volume expansion and water absorption testing procedures.

Volume Expansion

Expansion properties were tested for all samples by heat treating (baking) the individual samples at temperatures of 155 and 195° C. for 10 and 20 minutes in an oven, respectively. The heating ramp from room temperature (23° C.) to the respective baking temperature was 15 min (to 155° C.) or 10 min (to 195° C.). The temperatures and magnitude of expansion (in % based on the original volume prior to expansion) at the corresponding baking temperatures are shown in Table 2.

Expansions were determined for each sample by measuring the density before and after expansion. The densities were determined according to DIN EN ISO 1183 using the water immersion method (Archimedes principle) in deionised water and a precision balance to measure the mass.

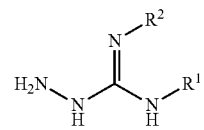

wherein $R^1$ and $R^2$ represent independently from each other a hydrogen atom or an amino group.

2. The thermally expandable composition according to claim 1, wherein the molar ratio of the amount of the aminoguanidine compound of formula (I) to the amount of the dicarboxylic acid in the at least one dicarboxylic acid salt of the aminoguanidine compound is in the range of 1:1 to 2:1.

3. The thermally expandable composition according to claim 1, wherein the dicarboxylic acid is an oxalic acid and/or the aminoguanidine compound of formula (I) is aminoguanidine.

TABLE 2

|  | Ref-1 | Ref-2 | Ref-2 | Ref-3 | Ex-1 | Ex-2 | Ex-3 | Ex-4 | Ex-5 | Ex-6 | Ex-7 | Ex-8 | Ex-9 |
|---|---|---|---|---|---|---|---|---|---|---|---|---|---|
| Compositions [wt.-%] | | | | | | | | | | | | | |
| Polymer TP1 | 37.45 | 37.20 | 37.10 | 36.90 | 37.20 | 37.10 | 36.90 | 36.70 | 36.10 | 35.90 | 36.90 | 36.90 | 36.90 |
| Polymer TP2 | 24.05 | 23.80 | 23.70 | 23.50 | 23.80 | 23.70 | 23.50 | 23.30 | 22.70 | 22.50 | 23.50 | 23.50 | 23.50 |
| Polymer EP | 11.25 | 11.25 | 11.15 | 10.95 | 11.25 | 11.15 | 10.95 | 10.75 | 10.15 | 9.95 | 10.95 | 10.95 | 10.95 |
| Polymer AP | 11.25 | 11.25 | 11.15 | 10.95 | 11.25 | 11.15 | 10.95 | 10.75 | 10.15 | 9.95 | 10.95 | 10.95 | 10.95 |
| Filler | 7.00 | 7.00 | 6.90 | 6.70 | 7.00 | 6.90 | 6.70 | 6.50 | 5.90 | 5.70 | 6.70 | 6.70 | 6.70 |
| Blowing agent BA | 9.00 | 9.00 | 9.00 | 9.00 | 9.00 | 9.00 | 9.00 | 9.00 | 12.00 | 12.00 | 9.00 | 9.00 | 9.00 |
| Catalyst-1 | — | 0.50 | 1.00 | 2.00 | — | — | — | — | — | — | — | — | — |
| Catalyst-2 | — | — | — | — | 0.50 | 1.00 | 2.00 | 3.00 | 3.00 | 4.00 | — | — | — |
| Catalyst-3 | — | — | — | — | — | — | — | — | — | — | 2.00 | — | — |
| Catalyst-4 | — | — | — | — | — | — | — | — | — | — | — | 2.00 | — |
| Catalyst-5 | — | — | — | — | — | — | — | — | — | — | — | — | 2.00 |
| Total | 100.00 | 100.00 | 100.00 | 100.00 | 100.00 | 100.00 | 100.00 | 100.00 | 100.00 | 100.00 | 100.00 | 100.00 | 100.00 |
| Properties | | | | | | | | | | | | | |
| Volume expansion @155° C., [%] | 22 | 159 | 139 | 197 | 399 | 371 | 567 | 689 | 827 | 853 | 65 | 19 | 37 |
| Volume expansion @195° C., [%] | 611 | 737 | 673 | 716 | 900 | 850 | 985 | 1210 | 1502 | 1569 | 879 | 844 | 852 |

The invention claimed is:

1. A thermally expandable composition comprising:
   a) a thermoplastic polymer component P and/or an elastomer component E,
   b) at least one chemical blowing agent BA comprising at least one dicarboxylic acid salt of an aminoguanidine compound, wherein the at least one chemical blowing agent BA is present as solid particles having a d90 particle size of not more than 350 µm and has a maximum decomposition peak temperature measured by Differential Scanning calorimetry (DSC) in a range of 135° C.-250° C.,
   c) optionally at least one free radical initiator I and/or a vulcanization system VS, and
   d) at least one guanidine derivative G different from the at least one dicarboxylic acid salt of an aminoguanidine compound, the at least one guanidine derivative G being present in an amount in a range of 1 to 5 wt.-% based on a total weight of the thermally expandable composition,
wherein the aminoguanidine compound is represented by formula (I)

4. The thermally expandable composition according to claim 1, wherein the at least one chemical blowing agent BA comprises 0.5-35 wt.-% of the total weight of the thermally expandable composition.

5. The thermally expandable composition according to claim 1, wherein the at least one guanidine derivative G is a functional guanidine of formula (II):

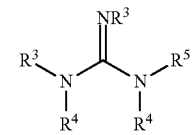

wherein $R^3$ represents a hydrogen atom or a monovalent linear or branched alkyl radical having 1 to 10 carbon atoms optionally comprising a nitrogen atom, a cycloaliphatic radical, an aryl radical, or an aryl alkyl radical;
$R^4$ represents a hydrogen atom or a monovalent linear or branched alkyl radical having 1 to 10 carbon atoms; and R⁵ represents a hydrogen atom or a monovalent linear or branched alkyl radical having 1 to 10 carbon atoms or a cycloaliphatic radical optionally comprising a nitrogen atom and/or an oxygen atom and/or silicon atom, an aryl radical, or an aryl alkyl radical.

6. The thermally expandable composition according to claim 1, wherein the at least one guanidine derivative G comprises 2 to 5 wt.-% of the total weight of the thermally expandable composition.

7. The thermally expandable composition according to claim 1, wherein the at least one guanidine derivative G is selected from the group consisting of cyanoguanidine, methyl guanidine, dimethyl guanidine, trimethyl guanidine, tetramethyl guanidine, acetylacetoneguanidine, 1,3-Di-o-tolylguanidine, 2-tert-Butyl-1,1,3,3-tetramethylguanidine, 1,2-dicyclohexyl-3-hexylguanidine, 1,2-Diisopropyl-3-phenylguanidine, and 1,2-Bis(2,6-diisopropylphenyl)-3-hexylguanidine.

8. The thermally expandable composition according to claim 1, wherein the thermoplastic polymer component P comprises at least 35 wt.-%, of the total weight of the thermally expandable composition.

9. The thermally expandable composition according to claim 1, wherein the thermoplastic polymer component P comprises a thermoplastic polymer TP and at least one of: an epoxy-functional polymer EP and an acid anhydride-functional polymer AP.

10. The thermally expandable composition according to claim 1, wherein the elastomer component E comprises at least one a solid rubber SR.

11. A baffle and/or a reinforcement element for hollow structures comprising the thermally expandable composition according to claim 1.

12. The baffle and/or reinforcement element of claim 11 further comprising a carrier on which the thermally expandable composition is deposited or attached.

13. A process for manufacturing the baffle and/or reinforcement element according to claim 12, wherein the thermally expandable composition is injection-molded onto the carrier or co-extruded with the carrier.

14. A method for sealing, baffling, or reinforcing of a cavity or a hollow structure of a land-, water-, or air-vehicle, and/or a cavity of a building such that the transmission of noise, vibrations, humidity, and/or heat is reduced, and/or the structure surrounding the cavity is mechanically strengthened, comprising introducing the baffle and/or reinforcement element according to claim 11 into the cavity or hollow.

15. A method for sealing, baffling and/or reinforcing a cavity or hollow structure, wherein an element comprising the thermally expandable composition according to claim 1 is introduced into the cavity or hollow structure and subsequently expanded by heat and/or UV treatment such that the cavity or hollow structure is at least partially filled by the expanded composition.

* * * * *